(12) United States Patent
Wang et al.

(10) Patent No.: US 12,051,419 B1
(45) Date of Patent: Jul. 30, 2024

(54) DEVICE CONTROL USING NEAR REAL TIME MODELING

(71) Applicant: Amazon Technologies, Inc., Seattle, WA (US)

(72) Inventors: Hongyang Wang, Seattle, WA (US); Amir Salimi, Seattle, WA (US); Siyuan Liu, Newcastle, WA (US); Sara Parker Hillenmeyer, Seattle, WA (US); Meet Prakash Vadera, Northampton, MA (US); Sunny Singh, Seattle, WA (US); Chandra Prakash Konkimalla, Seattle, WA (US); Yishuai Li, Woodinville, WA (US); Rajesh Bangaru Ravindranath, Bothell, WA (US); George Strajan, Seattle, WA (US); Marc Wetter, Burien, WA (US); William Evan Welbourne, Seattle, WA (US); Paul Aksenti Savastinuk, Bainbridge Island, WA (US); Charles Edwin Ashton Brett, Seattle, WA (US); Arpit Jain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 17/706,289

(22) Filed: Mar. 28, 2022

(51) Int. Cl.
*F24F 11/30* (2018.01)
*G06F 40/211* (2020.01)
*G10L 15/22* (2006.01)

(52) U.S. Cl.
CPC .......... *G10L 15/222* (2013.01); *G06F 40/211* (2020.01); *F24F 11/30* (2018.01); *G10L 2015/223* (2013.01); *G10L 2015/225* (2013.01)

(58) Field of Classification Search
CPC ..................................................... F24F 11/30
See application file for complete search history.

(56) References Cited

U.S. PATENT DOCUMENTS 10,126,010 B2 * 11/2018 Chen ................... F24F 11/65
11,454,410 B2 * 9/2022 Maruyama ......... G05B 19/0426

\* cited by examiner

*Primary Examiner* — Feng-Tzer Tzeng
(74) *Attorney, Agent, or Firm* — Lee & Hayes, P.C.

(57) ABSTRACT

Systems and methods for device control using near real time learning are disclosed. For example, an automatic action is performed by a target device in response to a predefined condition being met. Thereafter, context data is gathered and utilized to determine whether a negative user reaction has been provided in response to performance of the automatic action. When a negative user reaction is determined, mitigating actions may be taken close in time to when the context data is received to prevent further negative user reactions.

20 Claims, 13 Drawing Sheets

DEVICE CONTROL USING NEAR REAL TIME MODELING

BACKGROUND

Internet-of-things devices have become more common in homes and other environments. Some of these devices are associated with certain functionality that can be controlled remotely, such as from a user's personal device or from a system outside the environment. Described herein are improvements in technology and solutions to technical problems that can be used to, among other things, enhance use of smart home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
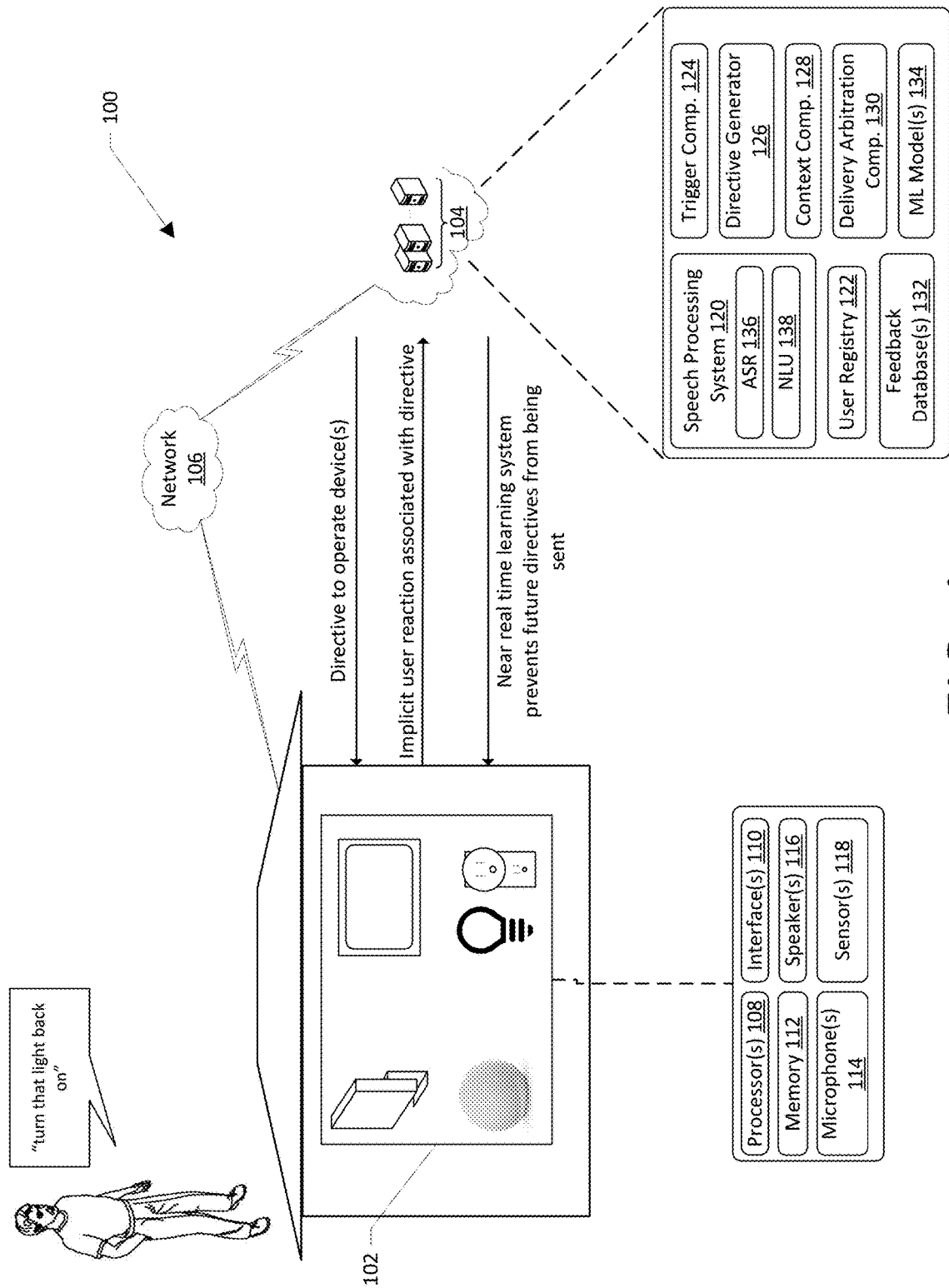
FIG. 1 illustrates a schematic diagram of an example environment for device control using near real time modeling.

Systems and methods for device control using near real time modeling are disclosed. Take, for example, an environment (such as a home, hotel, vehicle, office, store, restaurant, or other space) where one or more users may be present. The environments may include one or more electronic devices that may be utilized by the users or may otherwise be utilized to detect conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home" mode), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. As used herein, a "target device" may include an electronic device that is configured to at least receive a signal from one or more devices to cause the target device to perform one or more functionalities.

Some devices are now "smart devices" that include networking functionality or otherwise are able to communicate with other devices. For example, a light bulb, plug, thermostat, speaker, etc. may be "smart" or otherwise are configured with computing components that allow for the sending and receipt of signals to operate those devices and/or operate other devices based on the data sent from the devices. With this available technology, suggestions or other types of data based on system-generated "hunches" may be sent to user devices reminding users to operate certain device. Additionally or alternatively, some of these suggestions may cause a device to operate automatically or otherwise without requiring user input prior to operating. Directives to cause such automatic actions to be performed are sent to target devices from a system component (inside and/or outside the environment where the target device is) and/or are generated by the target devices themselves. These directives may be sent when prior user input indicates user preference to do so and/or when it is determined that the actions would be preferred based on historical data, modeling, etc.

However, sometimes the actions performed by target devices may not be satisfactory to a user. For example, a directive may be sent to a smart light bulb to turn off or otherwise stop emitting light at a given time of the day, say 6:00 pm each evening. But when the light turns off, user feedback may be received that indicates the user did not want the light to be turned off and, in examples, that the user prefers that the light not be subsequently turned off at 6:00 pm each day. Some of this user input may be explicit, such as a user providing a user utterance requesting that the action not be performed again. However, in other examples, implicit user input may be received and utilized to determine whether subsequent directives to turn the light off should be sent and/or whether the conditions to be satisfied prior to sending such directives should be updated or otherwise changed. Additionally, given the implicit nature of these user inputs and/or other context data not necessarily initiated by a user, it may be difficult to determine whether to utilize such data to immediately change how and/or when the directive is sent or whether to utilize such data as one of many signals that are modeled over time to determine how and/or when the directive is sent.

Described herein are techniques that allow for context data associated with an environment when an automatic action is performed to be analyzed to determine whether the context data should be utilized in one or more near real time learning models to quickly change how and/or when a directive to perform the action is sent. For example, a system and/or device may determine that one or more conditions have been satisfied for sending a directive to a target device to perform an action. The one or more conditions may have been user defined and/or the one or more conditions may have been determined based on historical use of the target device and/or similar devices. For example, when a user habitually requests that a smart plug be transitioned from an on state to an off state every day at or around 6:00 pm, this historical usage data may be utilized to generate a rule, such as a "routine" (e.g., combination of trigger event, such as time, followed by an action, such as directive to turn light on/off), indicating that a directive to cause the smart plug to transition from the on state to the off state should be sent to the target device at 6:00 pm each day. A directive generator of the system may be configured to determine when the one or more conditions are satisfied and to generate the directive to cause the target device to perform the automatic action.

Once the target device is operated, context data associated with the environment in which the target device is situated may be collected. In examples, the target device and/or other devices in the environment may be specifically queried to provide the context data based at least in part on the directive to perform the action being sent to the target device. In other examples, the context data may be generated and/or sent without a specific query and when the context data is received it may be tagged or otherwise indicated as being context data that is associated with performance of the action by the target device. The context data may be any data that indicates a condition of the environment and/or devices associated with the environment. Examples of context data may include, but are not limited to, device state changes, timing data indicating a time when devices are operated, audio data representing user utterances, intent data indicating determined intents associated with user input, activity state data indicating a state of the environment such as whether user presence is detected, and/or other inputs such as inputs determined as being relevant by one or more machine learning models, as described in more detail herein.

A trigger component of the system described herein may be configured to receive the context data and to determine whether the context data is to be utilized for device control using near real time learning. For example, the trigger component may be configured to determine a type of received data and to determine if the type of received data is designated as being applicable to the action performed by the target device. Sticking with the example of a smart plug transitioning from an on state to an off state, data from the environment may be received that indicates the target device has transitioned from the off state back to the on state, that a user is present in the environment where the target device is situated when the target device is in the off state, that another device was transitioned to an on state, etc. The trigger component may receive this data and may determine that such data is likely relevant to the action performed by the target device. For example, timing data may indicate that the context data at issue was received within a threshold period of time from when a given action is performed, particularly a scheduled action or an action that occurs as part of a routine. Additionally, determining whether the context data is relevant to the performed action, the system may utilize data associated with the user interaction itself. For example, when speech input is received, the system may determine that at least a portion of the speech input includes an identifier of the target device and/or that the speech input includes an identifier of a device state that differs from the device state that the target device was transitioned to. For example, if the action in question caused a kitchen light to transition from an on state to an off state, subsequent user input data associated with the kitchen light and/or user input data requesting to transition a device from the off state to the on state may be determined to be relevant to the action that was taken. Additional signals, such as presence data may be utilized to determine relevance of a given user reaction. For example, if the performed action caused a light to be turned off in a first room, but the user reaction was received from a device in a different room, the system may determine that the user reaction is not relevant to the action performed by the target device. In other examples, the data may indicate that a light in another room has been turned on, that a door lock has been locked, that a thermostat has increased a temperature in the environment, etc. The trigger component may receive this data and may determine that such data is likely not relevant to the action performed by the target device. For example, as noted above, if the performed action is to turn a kitchen light from an on state to an off state, the system may determine that operations of a device in a different room, such as a bedroom, is not relevant to the kitchen light action. Additionally, locking of a door lock or adjustment of a temperature on a thermostat may also not be considered relevant to the kitchen light device state transition. By so doing, the trigger component may act as an initial filter for data received from devices associated with the environment and may generally determine if the data is predesignated as indicating a user reaction to the action performed by a target device.

With respect to the context data described above, a context component of the system may be configured to receive, and/or query devices to receive, the context data. When the context component queries devices for context data, the context component may determine the devices considered to be relevant to the automatic action based at least in part on device type, prior device usage data, timing information, etc. Additionally, the context component may be configured to determine a timing parameter associated with received context data and/or to generate timing data indicating when the context data is received and, in examples, a sequence of received context data. This timing data may be utilized to determine which context data is most indicative of a user reaction and how multiple context data types relate to each other to indicate user reactions.

The context data determined to be relevant to a given automatic action may be utilized by one or more models, such as machine learning models, to determine whether the context data indicates a negative user reaction to the automatic action being performed and/or how and/or when the directive to perform the action should be changed based on the context data. When the model(s) determine that the context data indicates the negative user reaction to the automatic action being performed, feedback data indicating the negative user reaction may be utilized to generate data representing a "guardrail" for when and/or how subsequent directives to cause the action to be performed should be sent. This guardrail data may be stored in association with a delivery arbitration component of the system. The delivery arbitration component may utilize the guardrail data along with other guardrails to determine whether predefined condition(s) are satisfied for the directive to be sent.

To determine how to treat received context data, the model(s) may be configured to generate a score indicating a user reaction to the automatic action as determined from the context data. The score may be represented as a value or other data that quantifies a likelihood that the context data indicates a positive user reaction or a negative user reaction. For example, the score may be from +1 to −1, with +1 indicating a strong likelihood that the context data indicates a positive user reaction to the automatic action or otherwise intended by the user, and with −1 indicating a strong likelihood that the context data indicates a negative user reaction to the automatic action or otherwise not intended or preferred by the user. It should be understood that while a given scoring scale has been provided herein, that scale is provided by way of example and not as a limitation. The model(s) may also be configured to determine whether a given score satisfies a threshold score for utilizing the context data for near real time learning to determine how to alter the automatic action. For example, a threshold score of −0.5 may be established and when a score associated with context data satisfies that threshold, one or more operations may be performed utilizing near real time learning techniques. When the score does not satisfy the threshold score, the context data may be sent to one or more feedback databases. The feedback database(s) may be utilized to aggregate context data and other data that may be utilized for non-near real time learning embodiments.

When near real time learning techniques are utilized, a feedback component may be configured to determine what operations should be performed with respect to the automatic action based on the context data that was received. Utilizing the smart plug example above, if the automatic action was to cause the target device to transition to an off state and the context data indicates that within a minute of when that automatic action was performed user input was received requesting to transition the target device back to the on state, the feedback component may determine that this context data indicates an implicit user reaction to the automatic action being performed, here the user reaction being that the user wanted the smart plug to remain in an on state and had to request that the target device transition back to the on state. While the user, in examples, may not have provided explicit input indicating a negative reaction to performance of the automatic action, the feedback component may infer the negative reaction from the circumstances of the received context data, including timing of the context data, type of context data received, etc. When the feedback component determines that the context data indicates a negative user reaction to performance of the automatic action, the feedback component may determine whether to refrain from causing the directive to perform the automatic action to be sent to the target device, at least for a predetermined period of time until analysis of other feedback data can be performed. As such, in some examples, the near real time learning techniques described herein may lead to a result where the system determines to refrain from sending subsequent directives to perform the automatic action to the target device. In other examples, the near real time learning techniques described herein may lead to a result where the system determines new conditions and/or rules to apply for when and/or how the directive is to be sent. For example, using the example provided above, the context data may indicate that, when the negative user reaction was received, user presence was detected in a room where the target device is situated, and/or device states of other devices in the room differ from typical device states when the automatic action has been previously performed, etc. In these examples, the feedback component may determine one or more conditions associated with the environment in question and may apply those conditions to when the directive is to be sent. In this example, data representing a condition for sending the directive may be generated, with the condition being, for example, that user presence is not detected in the room in question.

By utilizing the techniques described herein, near real time analysis of context data indicating user reactions to automatic actions may be performed to prevent further unwanted actions from being performed by target devices. Additionally, given the potential complexity of context data indicating implicit user reactions, the techniques described herein intelligently determine when such context data should be used in near real time analysis to produce a near real time result or whether the context data should rather be utilized along with other data received over time to produce a result at a later time.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for state determination and device control. The system 100 may include, for example, one or more target devices 102. In certain examples, the devices 102 may be a voice-enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102 may be configured to send data to and/or receive data from a system 104, such as via a network 106. It should be understood that where operations are described herein as being performed by the system 104, some or all of those operations may be performed by the devices 102. It should also be understood that anytime the system 104 is referenced, that system may include any system and/or device, whether local to an environment of the devices 102 or remote from that environment. Additionally, it should be understood that a given space and/or environment may include numerous devices 102. It should also be understood that when a "space" or "environment" is used herein, those terms mean an area and not necessarily a given room, building, or other structure, unless otherwise specifically described as such.

The devices 102 may include one or more components, such as, for example, one or more processors 108, one or more network interfaces 110, memory 112, one or more microphones 114, one or more speakers 116, and/or one or more sensors 118. The microphones 114 may be configured to capture audio, such as user utterances, and generate corresponding audio data. The speakers 116 may be configured to output audio, such as audio corresponding to audio data received from another device and/or the system 104. The sensors 118 may be configured to detect an environmental condition associated with the devices 102 and/or the environment associated with the devices 102. Some example sensors may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 120, a user registry 122, a trigger component 124, a directive generator 126, a context component 128, a delivery arbitration component 130, one or more feedback databases 132, and/or one or more machine learning models 134. It should be understood that while the components of the system 104 are depicted and/or described as separate from each other in FIG. 1, some or all of the components may be a part of the same system. The speech processing system 120 may include an automatic speech recognition component (ASR) 136 and/or a natural language understanding component (NLU) 138. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 138 and/or as determined from user input via a computing device. Skills may be configured to utilize the intent to output data for input to a text-to-speech component, a link or other resource locator for audio data, and/or a directive to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with target devices 102 and may have been developed specifically to work in connection with given target devices 102. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the target devices 102 and the system 104 are described in detail below. In examples, some or each of the components of the system 104 may include their own processor(s), network interface(s), and/or memory. As such, by way of example, the speech processing system 120 may include and/or be associated with processor(s), network interface(s), and/or memory. The other components of the system 104, such as the delivery arbitration component 130, may include and/or be associated with different processor(s), network interface(s), and/or memory, or one or more of these components may utilize some or all of the same processor(s), network interface(s), and/or memory utilized by the speech processing system 120. These components are described in detail below. Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 122 may be configured to determine and/or generate associations between users, user accounts, environment identifiers, and/or devices. For example, one or more associations between user accounts may be identified, determined, and/or generated by the user registry 122. The user registry 122 may additionally store information indicating one or more applications and/or resources accessible to and/or enabled for a given user account. Additionally, the user registry 122 may include information indicating device identifiers, such as naming identifiers, associated with a given user account, as well as device types associated with the device identifiers. The user registry 122 may also include information indicating user account identifiers, naming indicators of devices associated with user accounts, and/or associations between devices, such as the devices 102. The user registry 122 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 120 may be configured to receive audio data from the devices 102 and/or other devices and perform speech-processing operations. For example, the ASR component 136 may be configured to generate text data corresponding to the audio data, and the NLU component 138 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn the light back off," the NLU component 138 may identify a "turn off" intent and the payload may be "the light." In this example where the intent data indicates an intent to transition a state of a device, the speech processing system 120 may call one or more speechlets to effectuate the intent. Speechlets, as described herein may otherwise be described as applications and may include functionality for utilizing intent data to generate directives and/or instructions. For example, a speechlet associated smart home devices may be called. The speechlet may be designated as being configured to handle the intent of transitioning device states, for example. The speechlet may receive the intent data and/or other data associated with the user utterance from the NLU component 138, such as by an orchestrator of the system 104, and may perform operations to transition a specific target device 102 from an off state to an on state, for example. The system 104 may generate audio data confirming that the action has been performed, such as by a text-to-speech component. The audio data may be sent from the system 104 to one or more of the devices 102.

The components of the system 100 are described below by way of example. For example, a system 104 may determine that one or more conditions have been satisfied for sending a directive to perform an action to a target device 102. The one or more conditions may have been user defined and/or the one or more conditions may have been determined based on historical use of the target device 102 and/or similar devices. Say for example a user habitually requests that a smart plug be transitioned from an on state to an off state every day at or around 6:00 pm. This historical use data, as an example of multiple potential types of data, may be utilized to generate a rule or otherwise a "routine" indicating that a directive to cause the smart plug to transition from the on state to the off state should be sent to the target device 102 at 6:00 pm each day. The directive generator 126 may be configured to determine when the one or more conditions are satisfied and to generate the directive to cause the target device 102 to perform the automatic action.

Once the target device 102 is operated, context data associated with the environment in which the target device 102 is situated may be collected. In examples, the target device 102 and/or other devices in the environment may be specifically queried to provide the context data based at least in part on the directive to perform the action being sent to the target device 102. In other examples, the context data may be generated and/or sent without a specific query and when the context data is received it may be tagged or otherwise indicated as being context data that is associated with performance of the action by the target device 102. The context data may be any data that indicates a condition of the environment and/or devices associated with the environment. Examples of context data may include, and are not limited to, device state changes, timing data indicating a time when devices are operated, audio data representing user utterances, intent data indicating determined intents associated with user input, activity state data indicating a state of the environment such as whether user presence is detected, and/or other inputs such as inputs determined as being relevant by one or more machine learning models 134, as described in more detail herein.

The trigger component 124 may be configured to receive the context data and to determine whether the context data is to be utilized for device control using near real time learning. For example, the trigger component 124 may be configured to determine a type of received data and to determine if the type of received data is designated as being applicable to the action performed by the target device 102. Sticking with the example of a smart plug transitioning from an on state to an off state, data from the environment may be received that indicates the target device 102 has transitioned from the off state back to the on state, that a user is present in the environment where the target device 102 is situated when the target device 102 is in the off state, that another device was transitioned to an on state, etc. The trigger component 124 may receive this data and may determine that such data is likely relevant to the action performed by the target device 102. In other examples, the data may indicate that a light in another room has been turned on, that a door lock has been locked, that a thermostat has increased a temperature in the environment, etc. The trigger component 124 may receive this data and may determine that such data is likely not relevant to the action performed by the target device 102. By so doing, the trigger component 124 may act as an initial filter for data received from devices associated with the environment and may generally determine if the data is predesignated as indicating a user reaction to the action performed by a target device 102.

The context component 128 may be configured to store data that the trigger component 124 may utilize to determine if received data indicates a user reaction to a given action performed by a target device 102. For example, the context data may indicate that when a device 102 having a certain device type performs an automatic action, certain devices and/or inputs and/or data types are to be considered relevant to that automatic action. The context component 128 may also be configured to query the devices at issue for the context data as described herein. Additionally, the context component 128 may be configured to determine a timing parameter associated with received context data and/or to generate timing data indicating when the context data is received and, in examples, a sequence of received context data. This timing data may be utilized to determine which context data is most indicative of a user reaction and how multiple context data types relate to each other to indicate user reactions.

The context data determined to be relevant to a given automatic action may be utilized by one or more models, such as machine learning models 134, to determine whether the context data indicates a negative user reaction to the automatic action being performed and/or how and/or when the directive to perform the action should be changed based on the context data. When the model(s) 134 determine that the context data indicates the negative user reaction to the automatic action being performed, feedback data indicating the negative user reaction may be utilized to generate data representing a "guardrail" for when and/or how subsequent directives to cause the action to be performed should be sent. This guardrail data may be stored in association with the delivery arbitration component 130. The delivery arbitration component 130 may utilize the guardrail data along with other guardrails to determine whether predefined condition(s) are satisfied for the directive to be sent.

To determine how to treat received context data, the model(s) 134 may be configured to generate a score indicating a user reaction to the automatic action as determined from the context data. The score may be any value or otherwise data that quantifies a likelihood that the context data indicates a positive user reaction or a negative user reaction. For example, the score may be from +1 to −1, with +1 indicating a strong likelihood that the context data indicates a positive user reaction to the automatic action or otherwise that the automatic action was intended, and with −1 indicating a strong likelihood that the context data indicates a negative user reaction to the automatic action or otherwise that the automatic action was not intended or preferred. It should be understood that while a given scoring scale has been provided herein, that scale is provided by way of example and not as a limitation. The model(s) 134 may also be configured to determine whether a given score satisfies a threshold score for utilizing the context data for near real time learning to determine how to alter how and/or when the automatic action is performed. For example, a threshold score of −0.5 may be established and when a score associated with context data satisfies that threshold, one or more operations may be performed utilizing near real time learning techniques. When the score does not satisfy the threshold score, the context data may be sent to the one or more feedback databases 132. The feedback database(s) 132 may be utilized to aggregate context data and other data that may be utilized for non-near real time learning embodiments.

When near real time learning techniques are utilized, a feedback component may be configured to determine what operations should be performed with respect to the automatic action based on the context data that was received. Utilizing the smart plug example above, if the automatic action was to cause the target device 102 to transition to an off state and the context data indicates that within a minute of when that automatic action was performed user input was received requesting to transition the target device 102 back to the on state, the feedback component may determine that this context data indicates an implicit user reaction to the automatic action being performed, here the user reaction being that the user wanted the smart plug to remain in an on state and had to request that the target device 102 transition back to the on state. While the user, in examples, may not have provided explicit input indicating a negative reaction to performance of the automatic action, the feedback component may infer the negative reaction from the circumstances of the received context data, including timing of the context data, type of context data received, etc. When the feedback component determines that the context data indicates a negative user reaction to performance of the automatic action, the feedback component may determine whether to refrain from causing the directive to perform the automatic action to be sent to the target device 102, at least for a predetermined period of time until analysis of other feedback data can be performed. As such, in some examples, the near real time learning techniques described herein may lead to a result where the system determines to refrain from sending subsequent directives to perform the automatic action to the target device 102. In other examples, the near real time learning techniques described herein may lead to a result where the system determines new conditions and/or rules to apply for when and/or how the directive is to be sent. For example, using the example provided above, the context data may indicate that when the negative user reaction was received user presence was detected in a room where the target device 102 is situated, and/or device states of other devices in the room differ from typical device states when the automatic action has been previously performed, etc. In these examples, the feedback component may determine one or more conditions associated with the environment in question and may apply those conditions to when the directive is to be sent. In this example, data representing a condition for sending the directive may be generated, with the condition being, for example, that user presence is not detected in the room in question.

By utilizing the techniques described herein, near real time analysis of context data indicating user reactions to automatic actions may be performed to prevent further unwanted actions from being performed by target devices 102. Additionally, given the potential complexity of context data indicating implicit user reactions, the techniques described herein intelligently determine when such context data should be used in near real time analysis to produce a near real time result or whether the context data should rather be utilized along with other data received over time to produce a result at a later time.

As used herein, the one or more models 134 may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with implicit user reactions from context data. The models may be trained for multiple user accounts and/or for a specific user account. As such, the machine learning models may be configured to learn, without human intervention, attributes of collected context data and/or detected presence events that are more likely and/or less likely to be associated with user reactions to automatic actions performed by target devices 102.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the system 104 and the associated functionality of those components as described herein may be performed by one or more of the devices 102. Additionally, or alternatively, some or all of the components and/or functionalities associated with the devices 102 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 108.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (Zig-Bee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102. For instance, the system 104 may be located within one or more of the devices 102. In some instances, some or all of the functionality of the system 104 may be performed by one or more of the devices 102. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
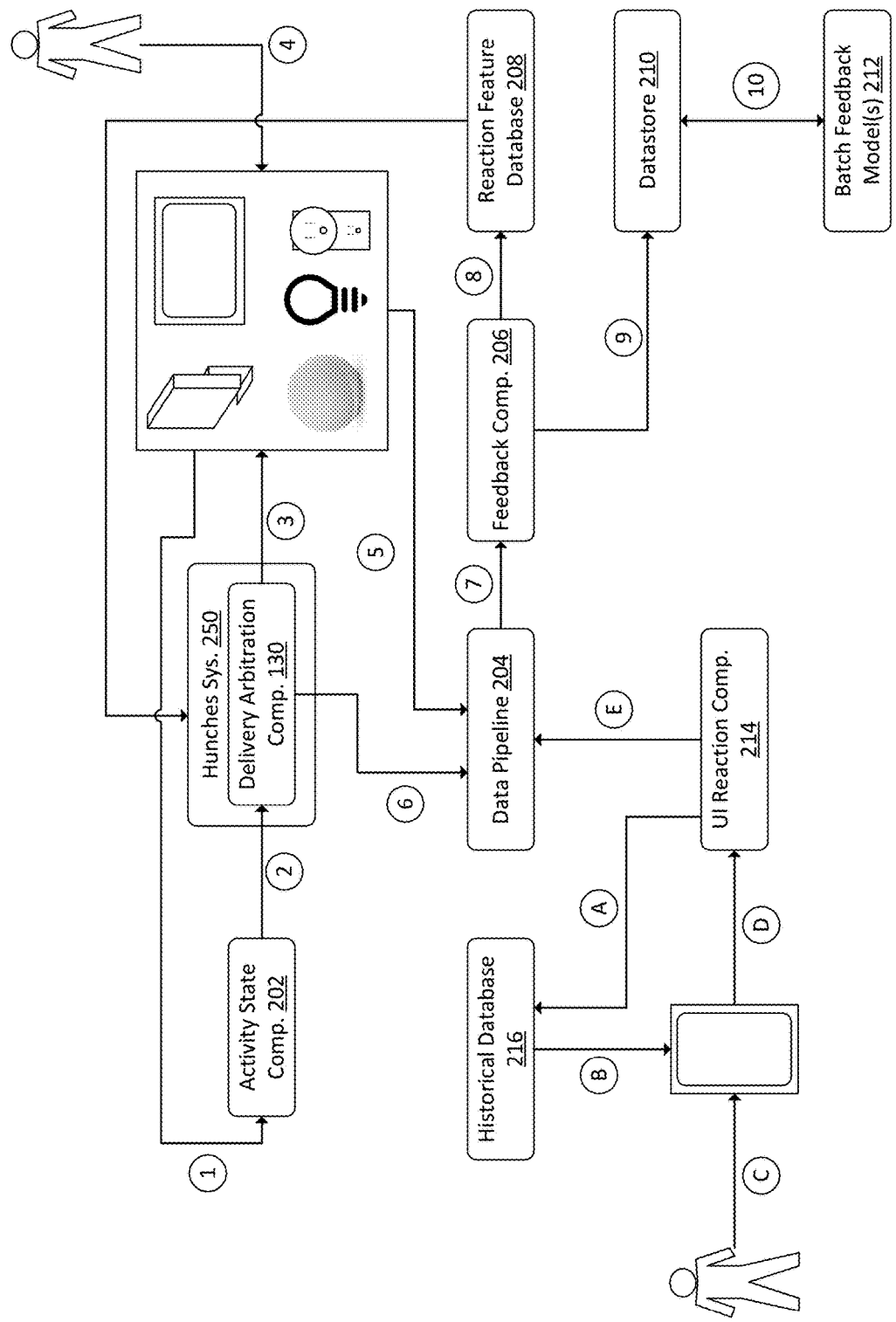
FIG. 2 illustrates a conceptual diagram of example components utilized for device control using near real time modeling.

FIG. 2 illustrates a conceptual diagram of example components utilized for device control using near real time learning. FIG. 2 may include some or all of the components described with respect to FIG. 1. For example, FIG. 2 may include a delivery arbitration component 130 and/or one or more target devices 102. FIG. 2 may also include an activity state component 202, a data pipeline 204, a feedback component 206, a reaction-feature database 208, a datastore 210, one or more batch feedback models 212, a user interface (UI) reaction component 214, and/or a historical database 216. Each of these components will be described in detail below. Additionally, the components may perform operations according to the steps 1-10 and steps A-D shown in FIG. 2. However, some or all of the operations may be performed in a different order from the example shown in FIG. 2 and/or some or all of the operations may be performed in parallel.

At step 1, the activity state component 202 may be configured to detect user presence and/or one or more other conditions associated with an environment that indicate activity state of the environment. For example, the one or more devices 102 may receive and/or send data indicating the state of the one or more devices, data indicating that a mobile device is in proximity to a given device such that the devices are in wireless communication with each other over a short-range communication network, data indicating the detection of movement in the environment, data indicating that an acoustic-event detection component of a device has identified an acoustic event, and/or other data such as naming indicators of the devices may be received and/or determined. This data may be generated and stored for devices associated with a given environment and/or for multiple electronic devices associated with multiple disparate environments. The devices and/or a system may generate and store this data, which may be utilized to generate and/or train models for determining the activity state associated with a given user profile. It should be understood that while examples of such event data are provided herein, those examples are not by way of limitation. Instead, the event data received from the devices may include any data that may indicate a state of the devices, other devices, and/or the environment.

Activity models generated and/or trained utilizing, for example, a neural network model may include one or more activity models that are configured to accept event data and generate, as output, results indicating that given event data corresponds to a given activity state and, in examples, a confidence associated with the activity state determination. The activity models may include a historical-activity model, which may be configured to determine an activity state associated with historical events associated with an electronic device and/or environment. For example, the historical-activity model may be configured to accept, as features to the historical-activity model, event data corresponding to historical events. The historical-activity model may generate, as output, data indicating that a given historical event corresponded to a given activity state. For example, the historical-activity model may be utilized to determine that a given time a week ago a given environment was associated with an asleep state based at least in part on the event data associated with that given time.

The activity models may also include the current-activity model, which may be configured to determine an activity state associated with a live or near-live event associated with an electronic device and/or environment. For example, the current-activity model may be configured to accept, as features to the current-activity model, event data corresponding to live events and/or near-live events. In examples, use of the current-activity model may be in association with the electronic device and/or the system causing one or more sensors or other components of the electronic device to generate live or near-live event data to be utilized by the current-activity model. The current-activity model may generate, as output, data indicating that a given live or near-live event corresponds to a given activity state. For example, the current-activity model may be utilized to determine that at a current time a given environment is associated with an active state based at least in part on event data associated with the current time. In examples, the current-activity model may be trained based at least in part on the output from the neural network model and/or from the output of the historical-activity model.

The activity models may also include the future-activity model, which may be configured to predict an activity state associated with events that may occur in the future associated with an electronic device and/or environment. For example, the future-activity model may be configured to accept, as features to the future-activity model, event data corresponding to the historical events and/or live or near-live events. The future-activity model may generate, as output, data indicating that a given event that is likely to occur at a given time in the future is likely to correspond to a given activity state. For example, the future-activity model may be utilized to determine that at a given time a week from now a given environment is likely to be associated with an away state based at least in part on historical event data and/or current event data associated with the given environment. In examples, the future-activity model may be trained based at least in part on the output from the neural network model and/or from the output of the historical-activity model and/or the current-activity model.

At step 2, the activity state component 202 may send data indicating the conditions of the environment to the delivery arbitration component 130. The delivery arbitration component 130 may be configured to determine whether predetermined conditions associated with a "hunch" or otherwise for when performance of an automatic action is to take place have been satisfied. When such conditions have been satisfied, at step 3, the delivery arbitration component 130 may cause the system, such as through a directive generator, to generate a directive for a target device to perform an automatic action and may send the directive to the target device. The delivery arbitration component 130 may be a component of a hunches system 250, which may be configured to determine one or more "hunches," otherwise referred to as recommendations, suggestions, and/or directives to perform automatic actions based on recommendations.

At step 4, user input and/or other context data may be provided to the one or more devices associated with an environment in which the target device is situated. For example, once the target device is operated, context data associated with the environment in which the target device is situated may be collected. In examples, the target device and/or other devices in the environment may be specifically queried to provide the context data based at least in part on the directive to perform the action being sent to the target device. In other examples, the context data may be generated and/or sent without a specific query and when the context data is received it may be tagged or otherwise indicated as being context data that is associated with performance of the action by the target device. The context data may be any data that indicates a condition of the environment and/or devices associated with the environment. Examples of context data may include, and are not limited to, device state changes, timing data indicating a time when devices are operated, audio data representing user utterances, intent data indicating determined intents associated with user input, activity state data indicating a state of the environment such as whether user presence is detected, and/or other inputs such as inputs determined as being relevant by one or more machine learning models, as described in more detail herein.

A trigger component of the system described herein may be configured to receive the context data and to determine whether the context data is to be utilized for device control using near real time learning. For example, the trigger component may be configured to determine a type of received data and to determine if the type of received data is designated as being applicable to the action performed by the target device. Sticking with the example of a smart plug transitioning from an on state to an off state, data from the environment may be received that indicates the target device has transitioned from the off state back to the on state, that a user is present in the environment where the target device is situated when the target device is in the off state, that another device was transitioned to an on state, etc. The trigger component may receive this data and may determine that such data is likely relevant to the action performed by the target device. In other examples, the data may indicate that a light in another room has been turned on, that a door lock has been locked, that a thermostat has increased a temperature in the environment, etc. The trigger component may receive this data and may determine that such data is likely not relevant to the action performed by the target device. By so doing, the trigger component may act as an initial filter for data received from devices associated with the environment and may generally determine if the data is predesignated as indicating a user reaction to the action performed by a target device.

At step 5, one or more of the devices may send the context data to the system, which may be received at the data pipeline 204 as context data. Additionally, at step 6, the delivery arbitration component 130 may be configured to send, to the data pipeline 204, data indicating the directive that was sent. By so doing, the data pipeline 204 may be configured to receive an indication of the action that was performed along with the condition(s) that were to be satisfied before the action was performed as well as the context data that may represent user reactions to the action being performed.

At step 7, the data pipeline may process the context data and data from the delivery arbitration component 130 to determine whether the context data should be analyzed utilizing near real time learning techniques as described herein. The data pipeline 204 may be configured to determine a timing parameter associated with received context data and/or to generate timing data indicating when the context data is received and, in examples, a sequence of received context data. This timing data may be utilized to determine which context data is most indicative of a user reaction and how multiple context data types relate to each other to indicate user reactions. The context data, as formatted or otherwise manipulated by the data pipeline 204, may then be sent to the feedback component 206.

At step 8, the feedback component 206 may be configured determine what operations should be performed with respect to the automatic action based on the context data that was received. Utilizing the smart plug example above, if the automatic action was to cause the target device to transition to an off state and the context data indicates that within a minute of when that automatic action was performed user input was received requesting to transition the target device back to the on state, the feedback component 206 may determine that this context data indicates an implicit user reaction to the automatic action being performed, here the user reaction being that the user wanted the smart plug to remain in an on state and had to request that the target device transition back to the on state. While the user, in examples, may not have provided explicit input indicating a negative reaction to performance of the automatic action, the feedback component 206 may infer the negative reaction from the circumstances of the received context data, including timing of the context data, type of context data received, etc.

When the feedback component 206 determines that the context data indicates a negative user reaction to performance of the automatic action, the feedback component 206 may determine whether to refrain from causing the directive to perform the automatic action to be sent to the target device, at least for a predetermined period of time until analysis of other feedback data can be performed. In this example, the feedback component 206 may send an indication of the negative user reaction and data associated therewith to the reaction feature database 208, which may be utilized to change how the delivery arbitration component 130 determines when and/or how to send the directive to perform the action. As such, in some examples, the near real time learning techniques described herein may lead to a result where the system determines to refrain from sending subsequent directives to perform the automatic action to the target device. In other examples, the near real time learning techniques described herein may lead to a result where the system determines new conditions and/or rules to apply for when and/or how the directive is to be sent. For example, using the example provided above, the context data may indicate that when the negative user reaction was received user presence was detected in a room where the target device is situated, and/or device states of other devices in the room differ from typical device states when the automatic action has been previously performed, etc. In these examples, the feedback component 206 may determine one or more conditions associated with the environment in question and may apply those conditions to when the directive is to be sent. In this example, data representing a condition for sending the directive may be generated, with the condition being, for example, that user presence is not detected in the room in question.

At step 9, the feedback component 206 may be configured to generate a score indicating a user reaction to the automatic action as determined from the context data. The score may be any value or otherwise data that quantifies a likelihood that the context data indicates a positive user reaction or a negative user reaction. For example, the score may be from +1 to −1, with +1 indicating a strong likelihood that the context data indicates a positive user reaction to the automatic action or otherwise that the automatic action was intended, and with −1 indicating a strong likelihood that the context data indicates a negative user reaction to the automatic action or otherwise that the automatic action was not intended or preferred. It should be understood that while a given scoring scale has been provided herein, that scale is provided by way of example and not as a limitation. The model(s) may also be configured to determine whether a given score satisfies a threshold score for utilizing the context data for near real time learning to determine how to alter how and/or when the automatic action is performed. For example, a threshold score of −0.5 may be established and when a score associated with context data satisfies that threshold, one or more operations may be performed utilizing near real time learning techniques.

When the score does not satisfy the threshold score, the context data may be sent to the datastore(s) 210. The datastores 210 may be utilized to aggregate context data and other data that may be utilized for non-near real time learning embodiments. At step 10, the batch feedback model(s) 212 may be configured to, periodically or otherwise, query the feedback data from the datastore(s) 210 and determine if that feedback data over a period of time indicates that an adjustment should be made to how and/or when the directive to perform the action is sent. This may be performed over a period of time and may not necessarily be performed in near real time.

In addition to the use of the context data to determine implicit user reactions to performance of automatic actions, data representing user inputs to user interfaces by users may also be utilized. For example, at step A, the UI reaction component 214 may be configured to generate one or more UIs that enable user input indicating reactions to actions performed by devices. For example, when the action is performed as described above, the UI reaction component 214 may be configured to generate a UI that indicates the action that was performed and that provides functionality for a user to indicate whether the action was preferred or not. At step B, the UI reaction component 214 may query the historical database 216 for historical user input associated with automated actions to generate and present the UIs.

At step C, the user may provide the user input to the UIs generated by the UI reaction component 214. In examples, the UI reaction component 214 may send a directive to a personal device associated with the user that may cause an application residing on the personal device to initiate and to display, sometimes without user input, the UI in question. The personal device, at step D, may send user input data corresponding to the user input to the UI reaction component 214, which may receive the user input data and determine what action the user input data is associated with.

At step E, the UI reaction component 214 may send reaction data to the data pipeline 204 that may be utilized by the data pipeline and the other components described herein to determine how and/or when a directive to perform the action should be sent thereafter.

In addition to the above, near real-time learning may be performed on inputs that do not necessarily relate to an action that was just performed, and/or may be performed on inputs that indicate a preference to have the action be performed at a later time. For example, the action taken at step 3 may, in some examples, be to immediately turn on a light such that the light goes from an off state to an on state. However, in other examples, the action may be for the light to dim over a period of time and/or brighten over a period of time. In these examples, the user reaction may not be received immediately when the brightness level of the light starts changing, but may be received at time that is near an end point of the brightness level change. The near real-time learning operations described herein may be configured to determine that the event at issue is a continuous or otherwise ongoing event where device states are changing over a period of time. This data may be utilized in association with the user reaction to determine whether a given user reaction is associated with the ongoing event or is associated with another event and/or device. The near real-time learning operations may also utilize this data to determine that the original state of the device prior to the ongoing event is the preferred state and not an incremental state, such as an incrementally brighter and/or dimmer state. Additionally, while some user reactions may indicate an immediate negative reaction to an automatic action being performed, some other user reactions may indicate that the action is preferred but just not at the time when the action was performed. The near real-time learning operations may include determining whether the user reaction indicates that the action is preferred at a later time and may generate data that causes subsequent instances of the action to be performed at the later time as opposed to refraining from performing the action altogether.

Figure 3:
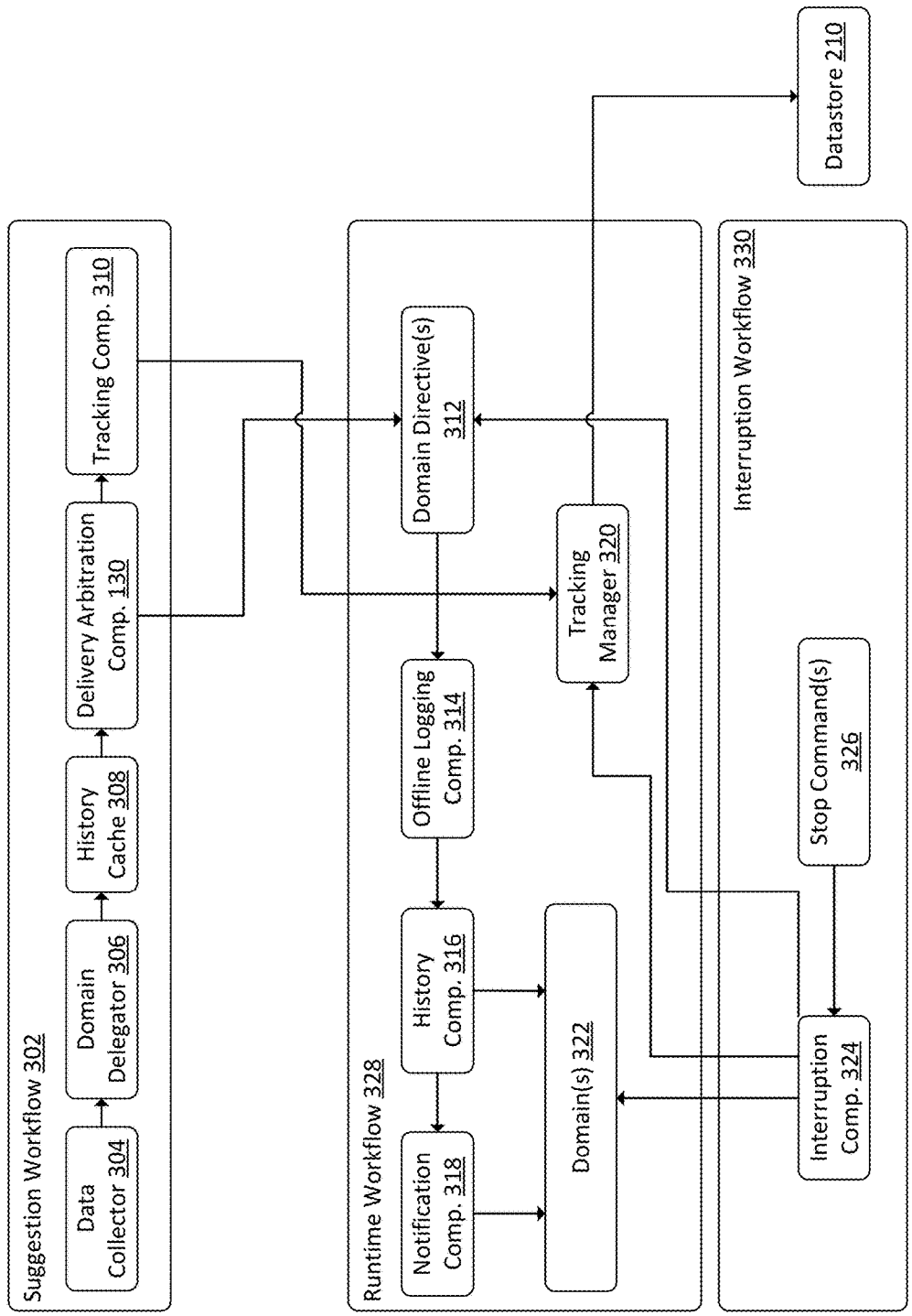
FIG. 3 illustrates a conceptual diagram of example components utilized for performing a suggestion workflow and runtime workflow associated with near real time modeling.

FIG. 3 illustrates a conceptual diagram of example components utilized for performing a suggestion workflow and runtime workflow associated with near real time learning. FIG. 3 may include some or all of the components described with respect to FIG. 1. For example, FIG. 3 may include a delivery arbitration component 130. FIG. 3 may also include a suggestion workflow 302, a data collector 304, a domain delegator 306, a history cache 308, a tracking component 310, one or more domain directives 312, an offline logging component 314, a history component 316, a notification component 318, a tracking manager 320, one or more domains 322, an interruption component 324, and/or one or more stop commands 326. Each of these components will be described in detail below.

For example, the suggestion workflow 302 may include components and operations that may be performed for providing a suggestion to a user device. The suggestion, otherwise described herein as a "hunch," may be to operate a certain target device, to perform certain actions, etc. In the examples provided herein, the suggestion may be an automatic suggestion or otherwise may be in the form of a directive that causes a target device to automatically perform an action such as transitioning device state. To do so, the data collector 304 may collect data associated with a given environment. The data may be any data that may be utilized to determine whether one or more conditions have been satisfied for performing the automatic action. The data collector 304 may query one or more of the devices in the environment at issue to send the data to be utilized for determining if the one or more conditions have been satisfied. In examples, the suggestion at issue may be associated with a given domain, which may otherwise be considered an application, skill, action generator, etc. In these examples, once the data is collected by the data collector 304, the domain delegator 306 may delegate the data to the domain that will utilize that data to determine whether the one or more conditions have been met. In addition to the data collected by the data collector 304, the history cache 308 may be configured to provide data indicating historical information associated with performing the automatic action. Such historical information may include a last time the action was performed, how frequently the action is performed, etc.

The delivery arbitration component 130 may receive the data acquired from the data collector 304 as well as the historical information from the history cache 308 and may determine whether the one or more conditions have been met for a directive to be sent to the target device at issue for performing the action. These conditions may include guardrails that may prevent the system from sending the directive under certain circumstances. For example, a given suggestion may be to cause a smart light to transition from an on state to an off state at a certain time of day and/or when certain environmental conditions are present such as a television in the same room not being on. The guardrails in this example may ensure that the required conditions are met before the directive to perform the action is sent. Additionally, the guardrails may mitigate duplicative directives being sent. For example, the system may continuously determine that the television is off and if left unchecked may continuously send a directive to cause the smart light to turn off. The guardrails may indicate that the same directive is not to be sent within a threshold amount of time from when the directive is originally sent.

When a directive is sent and/or when the delivery arbitration component 130 determines not to send the directive based at least in part on the guardrails, data indicating these events may be sent to the tracking component 310 of the suggestion workflow 302. The tracking component 310 may be configured to track events from the delivery arbitration component 130 and to provide data indicating the events to one or more other components of the system, such as to the tracking manager 320 of the runtime workflow 328. The runtime workflow 328 may be configured to receive and process acknowledgements associated with the suggestions described herein. To do so, the tracking manager 320 may be configured to determine how to process events received from the tracking component 310 of the suggestion workflow 302. Additionally, the delivery arbitration component 130 may be configured to send the events it produces to the one or more domain directives 312 of the runtime workflow 328. The domain directives may receive the suggestions from the delivery arbitration component 130 and may determine whether an action associated with the suggestion has been performed. In the example where the suggestion comprises an automatic action, the domain directives 312 may affirm that the action was performed and may send data indicating that the action was performed to the offline logging component 314. In examples, data provided to the tracking manager 320 may be sent to and stored in the database 210 for use in offline processing associated with the automatic action that was performed.

The offline logging component 314 may receive data indicating the events and may determine that the data may be utilized for runtime acknowledgement of the performed action. The offline logging component 314 may also be configured to provide data indicating the events to a data pipeline for near real time learning as described with respect to FIG. 4. The data representing the events may then be sent to the history component 316, which may be configured to store the events in association with the action that was performed. The notification component 318 of the runtime workflow 328 may be configured to query the history component 316 for the events, particularly when one or more notifications are received associated with the action that was performed, such as from the domain that is responsible for performing the action and/or generating the directive to perform the action.

In addition to the above operations, an interruption workflow 330 may also impact the actions that are performed and the data associated therewith. For example, one or more stop commands 326 may be received that indicate a user intent to cause one or more actions being performed by one or more devices to cease. In an example, the suggestion may be for music to start playing and the stop command 326 may correspond to a user utterance requesting that the device in question cease outputting the music. The interruption component 324 may be configured to receive data associated with the stop commands 326 to determine which domain to communicate to effectuate the user's intent.

Figure 4:
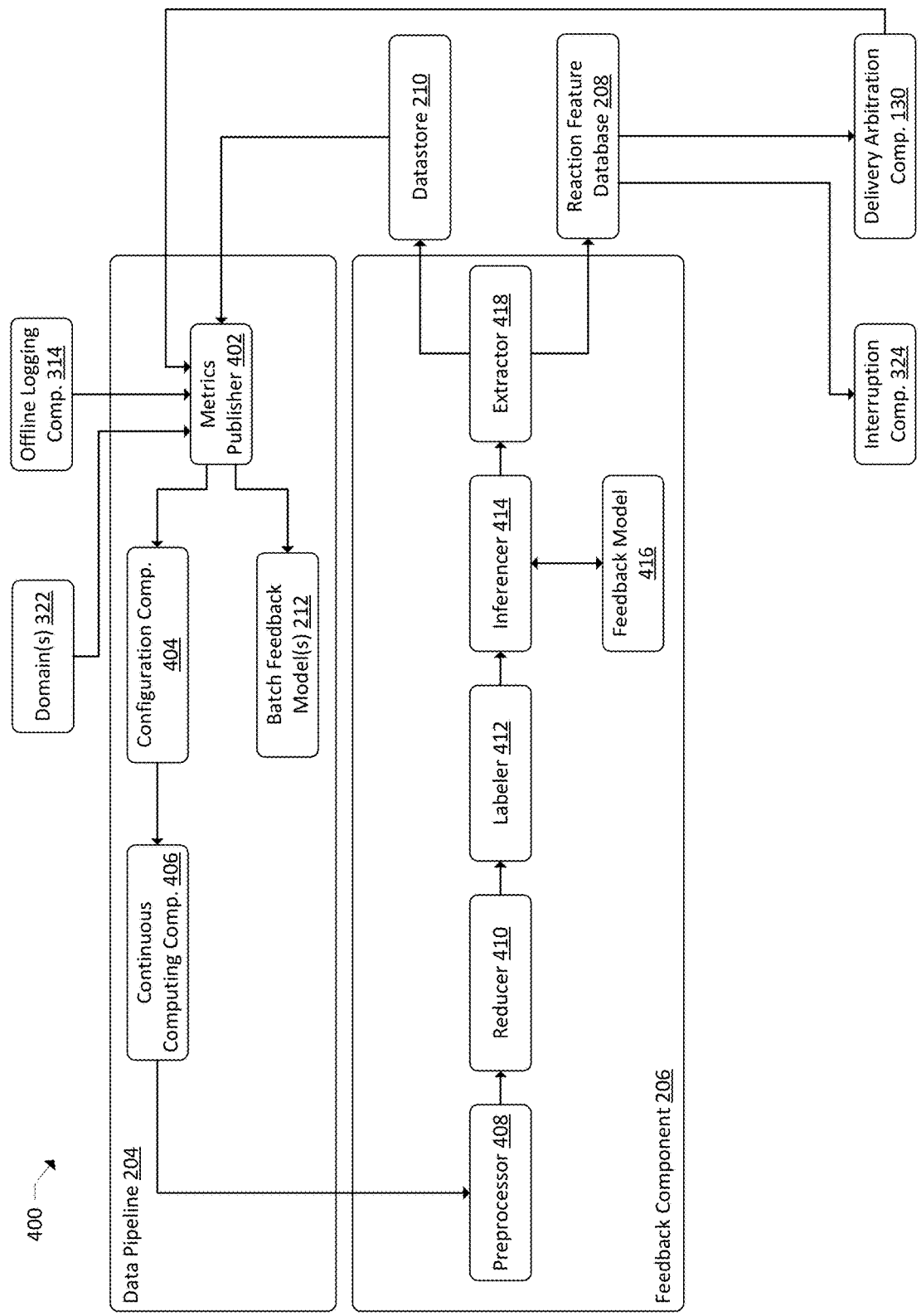
FIG. 4 illustrates a conceptual diagram of example components included in a data pipeline and in a feedback system as utilized for performing near real time modeling.

FIG. 4 illustrates a conceptual diagram of example components included in a data pipeline and in a feedback system as utilized for performing near real time learning. FIG. 4 may include some or all of the components described with respect to FIGS. 2 and 3. For example, FIG. 4 may include a delivery arbitration component 130, a datastore 210, one or more batch feedback models 212, a data pipeline 204, a reaction feature database 208, an offline logging component 314, one or more domains 322, and/or an interruption component 324. FIG. 4 may also include a metrics publisher 402, a configuration component 404, a continuous computing component 406, a preprocessor 408, a reducer 410, a labeler 412, an inference 414, a feedback model 416, and/or an extractor 418. Each of these components will be described in detail below.

From FIG. 3, data indicating the events associated with the automatic actions may be sent from the offline logging component 314 to the metrics publisher 402. Additionally, data from the domains 322, particularly data indicating interruptions as described with respect to FIG. 3 may be sent to and received at the metrics publisher 402. The metrics publisher 402 may be configured to determine whether the event at issue is an event that is predetermined to potentially indicate a user reaction to the event that could be acted on in near real time. When the event is not one of the predetermined events, the metrics publisher 402 may send the event to the batch feedback models 212 for aggregation with other events that may be utilized to determine how and/or when to modify suggestions in an offline embodiment. When the event is one of the predetermined events, the metrics publisher 402 may send the event to the configuration component 404. The configuration component 404 may be configured to format the data associated with the event such that it can be consumed by the continuous computing component 406. The formatting may include parsing and/or extracting data associated with the event that may be utilized for near real time learning and/or may include generating new data that indicates aspects of the event data, such as new data indicating that a user utterance was received, the domain the utterance was associated with, etc. The continuous computing component 406 may be configured to receive the formatted data and to process the data streams on the fly and to aggregate different types of data sources using a dynamic time window aggregating such data over a certain period of time.

This aggregated data may be sent to and received by the preprocessor 408 of the feedback component 206. The preprocessor 408 may format the aggregated data to be input into one or more near real time learning models for determining how and/or when to modify the directive to cause the action to be performed. The reducer 410 may be configured to reduce the data to the extent it is duplicative, is not relevant for a given directive and/or action, etc. The labeler 412 may be configured to generate metadata that labels the portions of the data for input into the models as described herein. The inferencer 414 may be configured to determine which model of potentially several models to select for performing near real time learning. For example, some models may be associated with given actions, directives, context data, etc., while other models may be associated with different actions, directives, context data, etc. The inferencer 414 may be configured to select the appropriate feedback model 416 to utilize for performing near real time learning.

The feedback model 416 may be configured to generate a score indicating a user reaction to the automatic action as determined from the context data. The score may be any value or otherwise data that quantifies a likelihood that the context data indicates a positive user reaction or a negative user reaction. For example, the score may be from +1 to −1, with +1 indicating a strong likelihood that the context data indicates a positive user reaction to the automatic action or otherwise that the automatic action was intended, and with −1 indicating a strong likelihood that the context data indicates a negative user reaction to the automatic action or otherwise that the automatic action was not intended or preferred. It should be understood that while a given scoring scale has been provided herein, that scale is provided by way of example and not as a limitation.

The model(s) 416 may return the score to the inferencer 414, which may communicate the score to the extractor 418. The extractor 418 may be configured to determine whether a given score satisfies a threshold score for utilizing the context data for near real time learning to determine how to alter how and/or when the automatic action is performed. For example, a threshold score of −0.5 may be established and when a score associated with context data satisfies that threshold, one or more operations may be performed utilizing near real time learning techniques. In this example, the results may be sent to the reaction feature database 208, which may generate and send data to the delivery arbitration component 130 and/or the interruption component 324. The delivery arbitration component 130 may utilize this data to generate and/or implement additional guardrails for the sending of the directive to perform the automatic action. The interruption component 324 may utilize this data to determine when certain context data indicates an interruption indicating a user preference to not have the action performed. When the score does not satisfy the threshold score, the context data may be sent to the datastore(s) 210. The datastore(s) 210 may be utilized to aggregate context data and other data that may be utilized for non-near real time learning embodiments.

Figure 5:
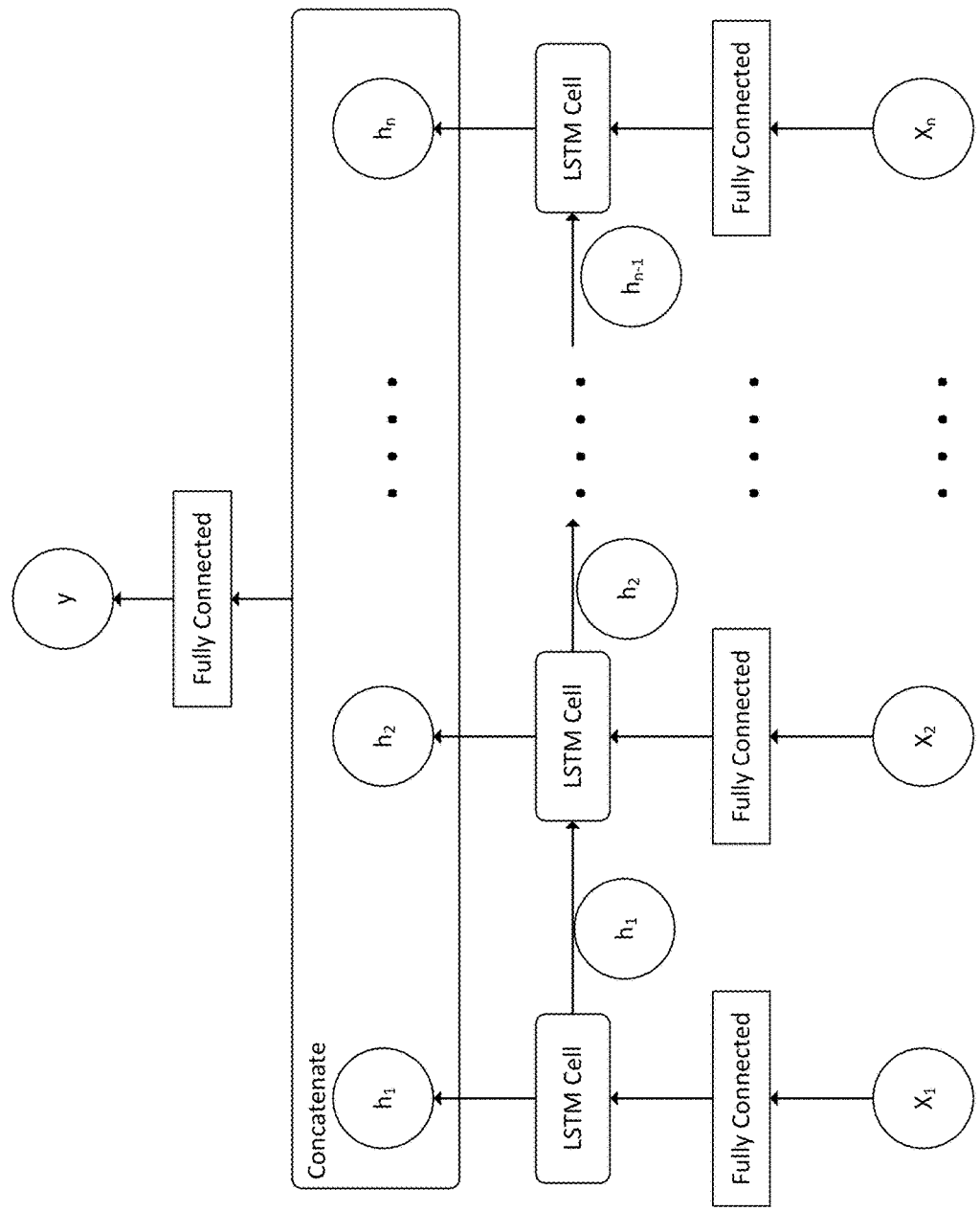
FIG. 5 illustrates a conceptual diagram of example components and data associated with a machine learning model utilized for near real time modeling.

FIG. 5 illustrates a conceptual diagram of example components and data associated with a machine learning model utilized for near real time learning.

The model depicted in FIG. 5 may include a Bayesian sequential activity model configured to quantify uncertainty in predictions by modeling uncertainty in the model parameters. Understanding the uncertainty of the activity model may be important as actions may be dependent on outputs associated therewith. As inputs, the sequential activity model may take the data for the past 24 hours or other period of time for example (presented as features generates every 30 minutes), and as outputs, may produce the probability for each of "active", "away", and "inactive" classifications.

There may be two types of feedback that are received for intelligent control of devices: explicit feedback and implicit feedback. The model compensates for biased data distribution at time points. To do so, a combination of different loss functions such as delayed feedback loss, fake negative weighted loss, and fake negative calibration among the others may be considered and utilized. Additionally, both negative and positive feedback may be taken into account for training the model as described herein.

When analyzing user feedback and/or other context data, implicit feedback on operation of a light is used as an illustrative example. Here, there may be considered three types of implicit feedback: "no reversion," "reversions," and "action interrupted." The "no reversion" case is a favorable case, and the goal would be to have as few reversions as possible while taking actions. The "reversion" and "action interrupted" case denotes when the users revert/interrupt the actions, and is thus the negative feedback to be avoided. The model may take as input the past history of actions, uncertainty and confidence of the Bayesian model for each of the events related to past actions, observed user feedback for each of the past actions (e.g., reversion or no reversion), current action suggested by the system, current uncertainty and confidence of the Bayesian model, etc. For the uncertainty measures, these uncertainty measures may be useful to help understand the source of uncertainty for the predictions (i.e. aleatoric/epistemic). Action embedding includes the action that was taken as well as the cyclical embeddings of the timestamp. Finally, for the historical context, user feedback may be included for past actions. As a part of user feedback features, information indicating whether the action was reverted/not-reverted (also while having an option of encoding "action interrupt") may be utilized. For actions that were reverted, the amount of time in which the action was reverted may be encoded. Encoding interrupts and reaction time may be to emphasize that the actions that have been reverted quickly denote a higher level of intensity of the feedback. As output, the model may predict the probability of whether or not a given action will be reverted. The data set may be generated in a sliding window manner for each customer, so as to generate the labeled data set. Finally, the model may be trained using a maximum-a-posteriori estimation method.

For a recurrent model architecture, a long short-term memory (LSTM) layer may be used as the recurrent variant. At every time step, the recurrent model may generate a hidden state (h) which may then be fed into the next time step, and finally the output hidden state from the last time step may be fed through a fully-connected network to generate the outputs. However, it may be difficult to train the model through the time steps. To mitigate this problem, the hidden states may be concatenated from each of the time steps, and passed it through the fully connected network to obtain the outputs so as to improve gradient flow through the sequence.

Figure 6:
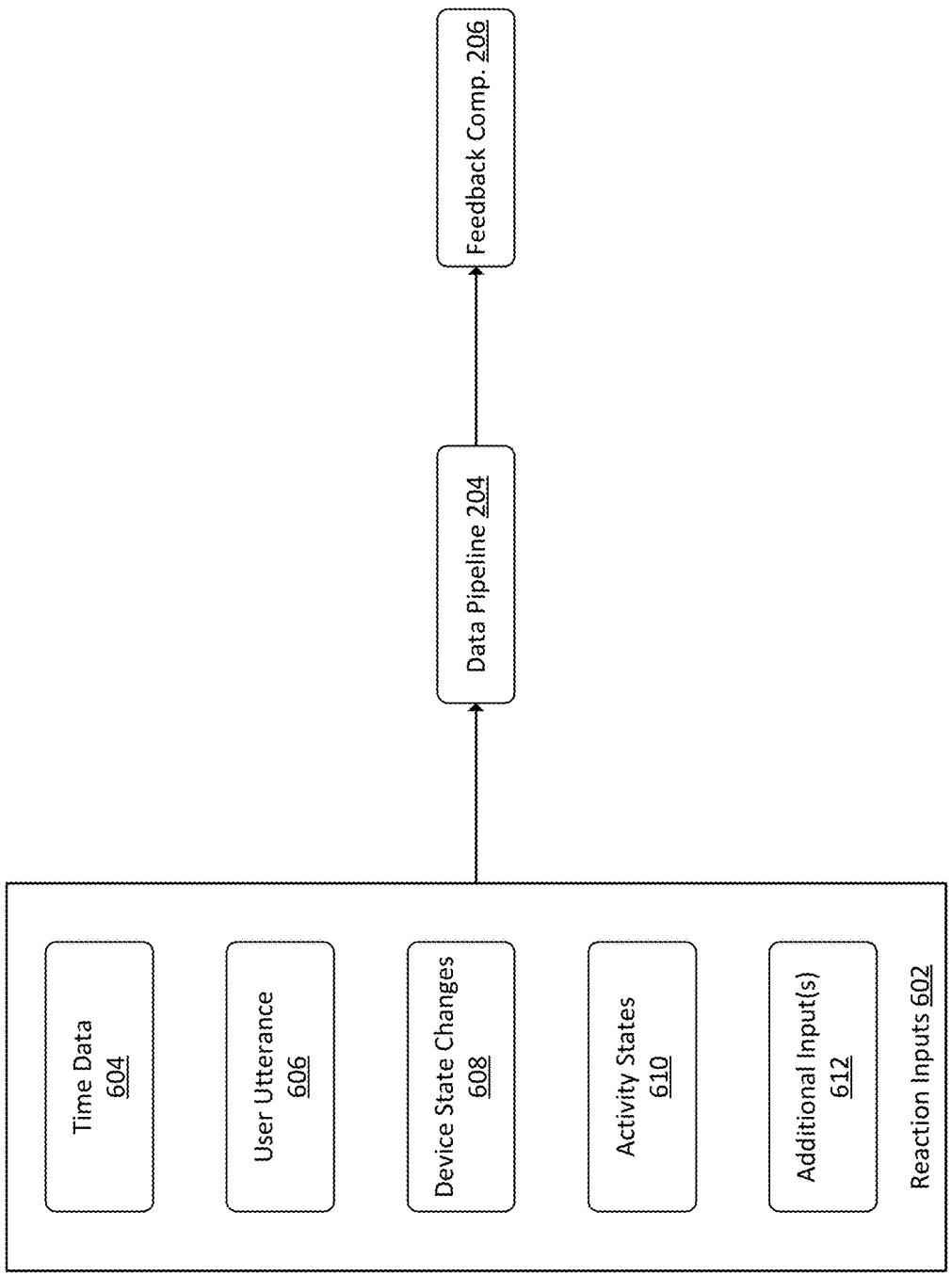
FIG. 6 illustrates example inputs utilized for determining whether a given action performed by a device is unsatisfactory in a near real time learning environment.

FIG. 6 illustrates example inputs utilized for determining whether a given action performed by a device is not satisfactory in a near real time learning environment. FIG. 6 may include the same or similar components as described with respect to FIG. 2, such as a data pipeline 204 and/or a feedback component 206. FIG. 6 may also include one or more reaction inputs 602, which may include time data 604, data representing user utterances 606, data representing device state changes 608, data indicating activity states 610, and/or additional inputs 612 such as inputs determined from machine learning techniques.

For example, the time data 604 may indicate a time at which certain context data was received and/or produced. The time may be a time of day and/or an amount of time from when an action was performed and/or an amount of time from when other context data was received. The data representing the user utterances 606 may include text data representing the user utterance, intent data indicating a determined intent associated with the user utterance, a domain associated with the user utterance, a speechlet used to respond to the user utterance, and/or any other attributes of the user utterance. The data representing the device state changes 608 may include device identifiers of devices that underwent a state change, an indication of the change of state, data indicating the state of the device in question before and/or after the state change, whether the state change was user initiated or automated, etc. The data indicating activity states 610 may include indications of whether the environment in which the target device is situated was in a given activity state before and/or after the automated action was performed. The additional inputs 612 may include any context data that may be determined from the target device in question, from other devices in the environment, and/or from the environment itself, including any and all types of user input data and inputs that were determined utilizing machine learning techniques as described herein.

The data pipeline 204 may receive this context data may be configured to store data that a trigger component may utilize to determine if received data indicates a user reaction to a given action performed by a target device. For example, the context data may indicate that when a device having a certain device type performs an automatic action, certain devices and/or inputs and/or data types are to be considered relevant to that automatic action. The data pipeline 204 may also be configured to query the devices at issue for the context data as described herein. Additionally, the context component may be configured to determine a timing parameter associated with received context data and/or to generate timing data indicating when the context data is received and, in examples, a sequence of received context data. This timing data may be utilized to determine which context data is most indicative of a user reaction and how multiple context data types relate to each other to indicate user reactions.

The context data determined to be relevant to a given automatic action may be utilized by one or more models, such as machine learning models, to determine whether the context data indicates a negative user reaction to the automatic action being performed and/or how and/or when the directive to perform the action should be changed based on the context data. When the model(s) determine that the context data indicates the negative user reaction to the automatic action being performed, feedback data indicating the negative user reaction may be utilized to generate data representing a "guardrail" for when and/or how subsequent directives to cause the action to be performed should be sent. This guardrail data may be stored in association with a delivery arbitration component of the system. The delivery arbitration component may utilize the guardrail data along with other guardrails to determine whether predefined condition(s) are satisfied for the directive to be sent.

To determine how to treat received context data, the model(s) of the feedback component 206 may be configured to generate a score indicating a user reaction to the automatic action as determined from the context data. The score may be any value or otherwise data that quantifies a likelihood that the context data indicates a positive user reaction or a negative user reaction. For example, the score may be from +1 to −1, with +1 indicating a strong likelihood that the context data indicates a positive user reaction to the automatic action or otherwise that the automatic action was intended, and with −1 indicating a strong likelihood that the context data indicates a negative user reaction to the automatic action or otherwise that the automatic action was not intended or preferred. It should be understood that while a given scoring scale has been provided herein, that scale is provided by way of example and not as a limitation. The model(s) may also be configured to determine whether a given score satisfies a threshold score for utilizing the context data for near real time learning to determine how to alter how and/or when the automatic action is performed. For example, a threshold score of −0.5 may be established and when a score associated with context data satisfies that threshold, one or more operations may be performed utilizing near real time learning techniques. When the score does not satisfy the threshold score, the context data may be sent to one or more feedback databases. The feedback database(s) may be utilized to aggregate context data and other data that may be utilized for non-near real time learning embodiments.

Figure 7:
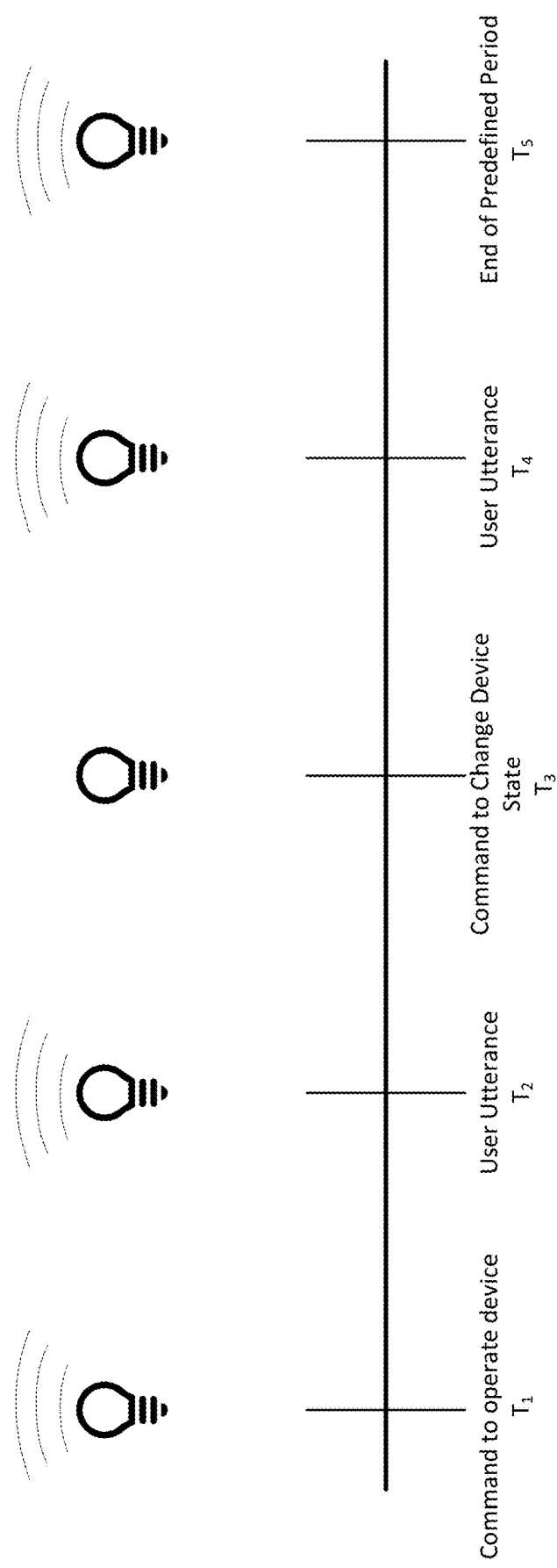
FIG. 7 illustrates a conceptual diagram of a timeline associated with device state changes as utilized for near real time modeling.

FIG. 7 illustrates a conceptual diagram of a timeline associated with device state changes as utilized for near real time learning. FIG. 7 illustrates an example target device, here seen as a smart light, that may be operated to cause the smart light to emit light or to not emit light. The timeline shows a progression of time from $T_1$ to $T_5$, with various events occurring therebetween. The model(s) described herein as being utilized for near real time learning may be trained to utilize received context data from the time when an automatic action occurs, here $T_1$, to a predetermined amount of thereafter, here $T_5$.

As shown in FIG. 7, at $T_1$, a directive to cause the smart light to emit light is sent to the smart light and causes the smart light to emit light. Thereafter, at $T_2$, a user utterance is received and processed by a speech processing system associated with smart light. In this example, the smart light continued to emit light even though the user utterance was received. This may indicate that while the user utterance was received during a period of time where the data representing the user utterance could constitute context data for determining whether the automatic action was preferred by the user, the lack of device state change at $T_2$ indicates that the user utterance was not related to the automatic action being performed. As such, in examples, this user utterance may be disregarded and not utilized as context data to determine a user reaction to the automatic action. It should be understood that other user utterances that do not cause a state change in the target device may still be relevant as a user reaction to the automatic action, such as a user request to turn on or off another light in the same room as the target device.

At $T_3$, a device state change of the target device is detected. Here, the state change is a transition between an on state and an off state. Given that this data indicates a change to the target device in question and that the state change occurred prior to $T_5$, this data may be considered as context data for determining user reactions to the automatic action being performed. At $T_4$, another user utterance is received that causes the smart light to transition to the on state. And at $T_5$, the smart light remains in the on state.

Utilizing the example context data described herein, the near real time learning system described herein may initially determine that the device state change at $T_3$ from a state that differs from the device state caused by the automatic action indicates a negative reaction to the automatic action being performed. However, the user utterance at $T_4$ that causes the smart light to transition back to the state associated with the automatic action may indicate a positive user reaction to the automatic action being performed. An example scenario where this might occur is when the smart light is accidentally turned off at $T_3$ and the user requests that the light be turned back on at $T_4$. Without the use of a sequence of context data as illustrated in FIG. 7, the near real time learning system may have determined from the context data at $T_3$ that a negative user reaction has occurred and may have caused the automatic action to stop being performed and/or may have unnecessarily altered the conditions for the automatic action to be performed in the future. Utilizing the sequence of context data, though, the near real time learning system may determine that the context data as a whole received prior to $T_5$ indicates either a positive user reaction or an inconclusive result where the automatic action is not altered.

FIGS. 8-11 illustrate processes for device control using near real time learning. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, 12, and 13, although the processes may be implemented in a wide variety of other environments, architectures and systems.

Figure 8:
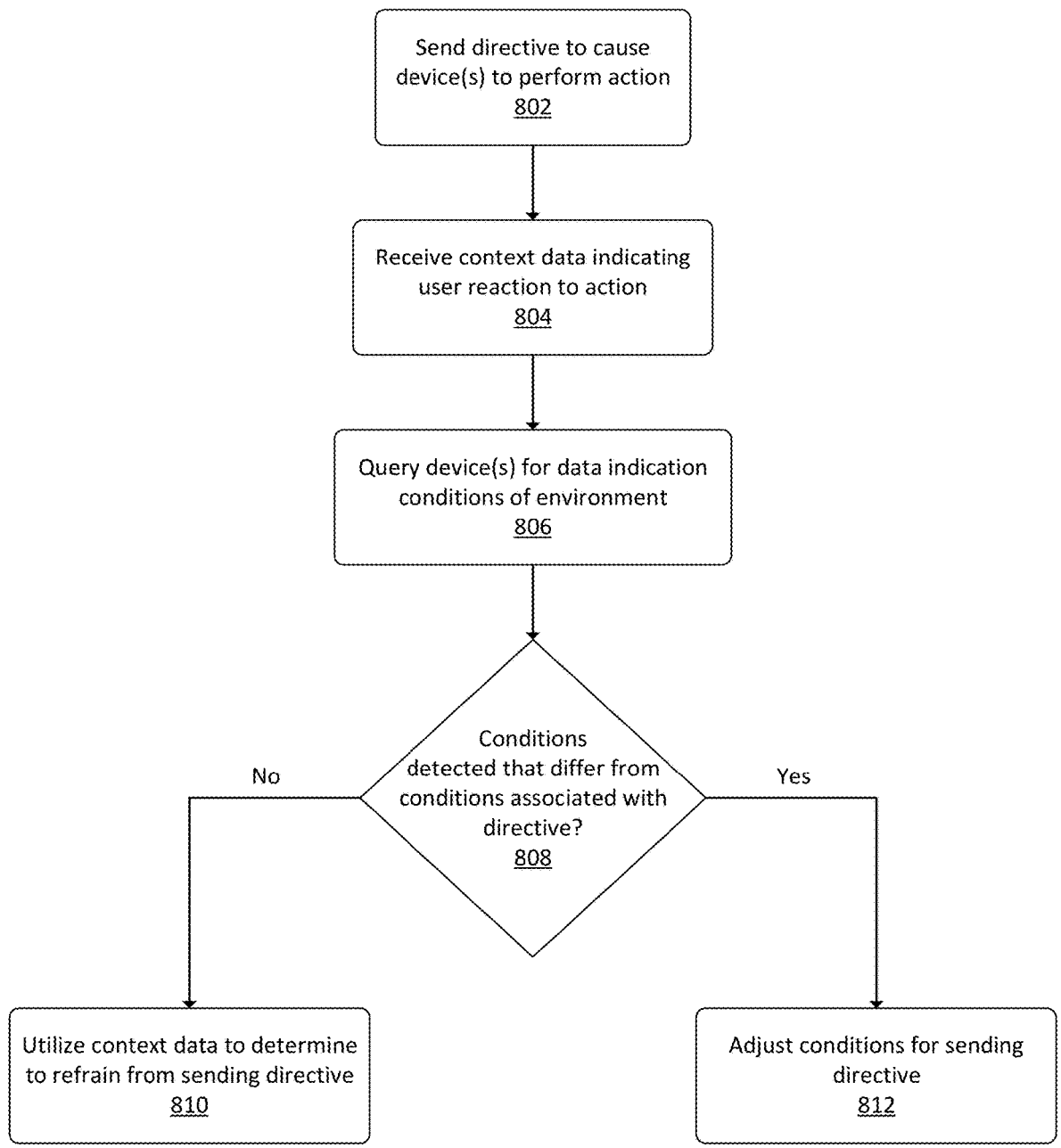
FIG. 8 illustrates a flow diagram of an example process for determining conditions associated with an environment when negative user reactions are received, and utilizing those conditions for subsequent actions.

FIG. 8 illustrates a flow diagram of an example process 800 for determining conditions associated with an environment when negative user reactions are received, and utilizing those conditions for subsequent actions. The order in which the operations or steps are described is not intended to be construed as a limitation, and any number of the described operations may be combined in any order and/or in parallel to implement process 800.

At block 802, the process 800 may include sending a directive to cause one or more target devices to perform an action. For example, a light bulb, plug, thermostat, speaker, etc. may be "smart" or otherwise are configured with computing components that allow for the sending and receipt of signals to operate those devices. With this available technology, suggestions or otherwise "hunches" may be sent to user devices reminding users to operate certain device. Some of these suggestions may cause a device to operate automatically or otherwise without requiring user input prior to operating. Directives to cause such automatically actions to be performed are sent to target devices from a system or are generated by the target devices themselves or by another device located within the environment where the target device is disposed. These directives may be sent when prior user input indicates a preference to do so and/or when it is determined that the actions would be preferred based on historical data, modeling, etc.

However, sometimes the actions performed by target devices may not be preferred by a user. For example, a directive may be sent to a smart light bulb to turn off or otherwise stop emitting light at a given time of the day, say 6:00 pm each evening. But when the light turns off, user feedback may be received that indicates the user did not want the light to be turned off and, in examples, that the user prefers that the light not be subsequently turned off at 6:00 pm each day. Some of this user input may be explicit, such as a user providing a user utterance requesting that the action not be performed again. However, in other examples, implicit user input may be received and utilized to determine whether subsequent directives to turn the light off should be sent and/or whether the conditions to be satisfied prior to sending such directives should be updated or otherwise changed. Additionally, given the implicit nature of these user inputs and/or other context data not necessarily initiated by a user, it may be difficult to determine whether to utilize such data to immediately change how and/or when the directive is sent or whether to utilize such data as one of many signals that are modeled over time to determine how and/or when the directive is sent.

At block 804, the process 800 may include receiving context data indicating a user reaction to the action that was performed. For example, once the target device is operated, context data associated with the environment in which the target device is situated may be collected. In examples, the target device and/or other devices in the environment may be specifically queried to provide the context data based at least in part on the directive to perform the action being sent to the target device. In other examples, the context data may be generated and/or sent without a specific query and when the context data is received it may be tagged or otherwise indicated as being context data that is associated with performance of the action by the target device. The context data may be any data that indicates a condition of the environment and/or devices associated with the environment. Examples of context data may include, and are not limited to, device state changes, timing data indicating a time when devices are operated, audio data representing user utterances, intent data indicating determined intents associated with user input, activity state data indicating a state of the environment such as whether user presence is detected, and/or other inputs such as inputs determined as being relevant by one or more machine learning models, as described in more detail herein.

At block 806, the process 800 may include querying one or more devices associated with the environment at issue for data indicating conditions of the environment. For example, the target device that was operated may be queried for the environmental conditions and/or one or more other devices may be queried. The conditions may be any conditions of the environment and/or the devices situated therein. For example, the conditions may include device states, presence detections, activity state determinations, etc.

At block 808, the process 800 may include determining whether conditions were detected that differ from conditions associated with the sending of the directive. For example, when a directive is sent to cause an automatic action to be performed, doing so may be based at least in part on one or more conditions being satisfied, such as a predefined time occurring, devices being in certain states, etc. The conditions for sending the directive to perform the automatic action may be compared to the conditions of the environment as received in response to the query to determine differences between those conditions.

In examples where the detected conditions do not differ from the conditions associated with the sending of the directive, the process 800 may include, at block 810, utilizing the context data to determining to refrain from subsequently sending the directive to cause the action to be performed. In this example, a negative user reaction to the performed action has been determined, which indicates that the automatic action should likely not be subsequently performed, but not enough data is available to determine whether a change to the rules for sending the directive should be made.

In examples where the detected conditions differ from the conditions associated with the second of the directive, the process 800 may include, at block 812, generating data that adjusts the conditions for when the directive is sent. By so doing, the system may, in near real time from when the context data is received, determine how the conditions for sending the directive should be altered such that a negative user reaction is not received again when the automatic action is performed. For example, the rule for sending the directive may indicate that the directive is to be sent at a given time of day, but only if user presence is not detected in the environment at that time.

Figure 9:
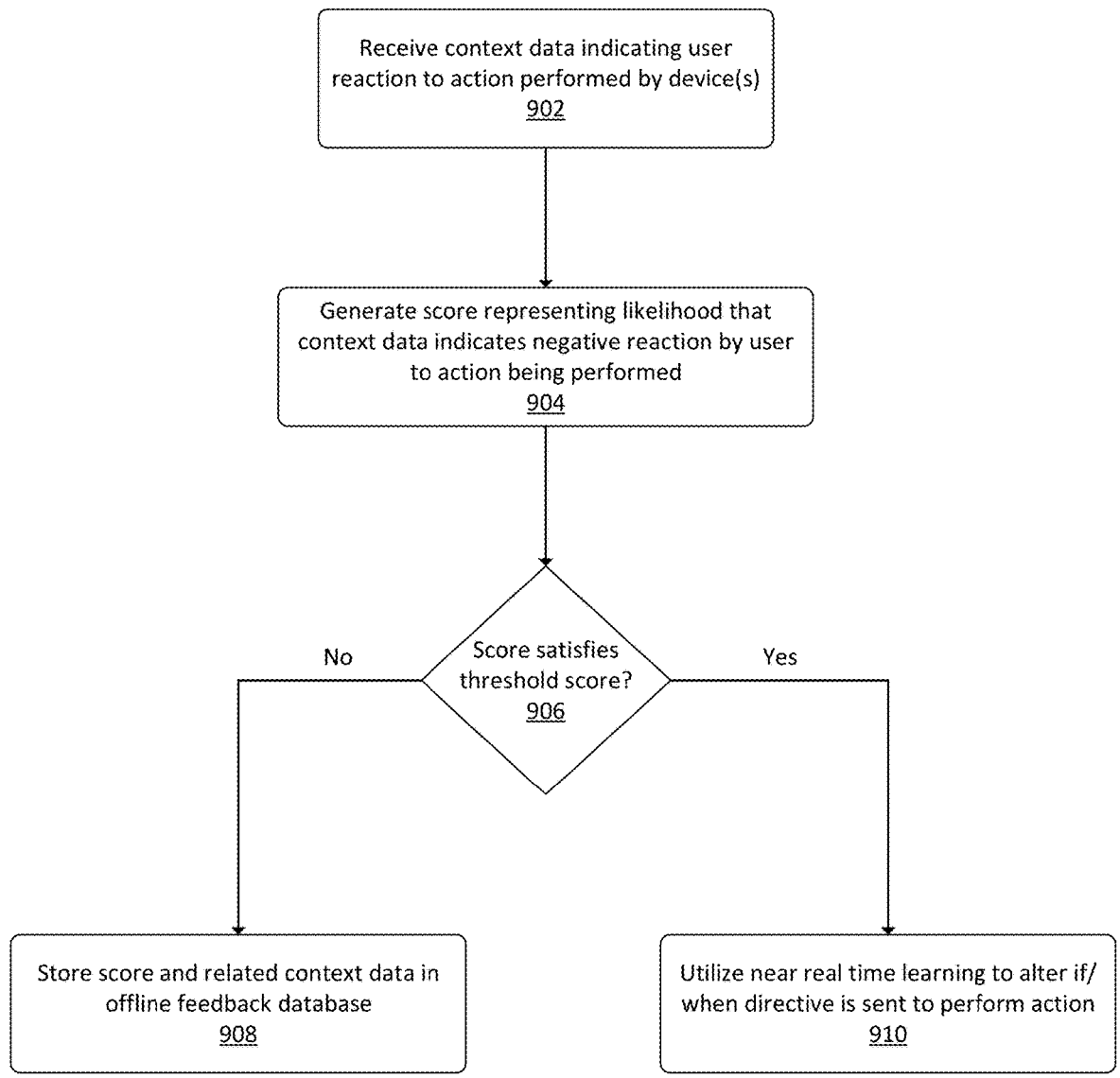
FIG. 9 illustrates a flow diagram of an example process for generating a score associated with received context data and determining an action to perform based on the score.

FIG. 9 illustrates a flow diagram of an example process 900 for generating a score associated with received context data and determining an action to perform based on the score. The order in which the operations or steps are described is not intended to be construed as a limitation, and any number of the described operations may be combined in any order and/or in parallel to implement process 900.

At block 902, the process 900 may include receiving context data indicating a user reaction to an action performed by a target device. For example, once the target device is operated, context data associated with the environment in which the target device is situated may be collected. In examples, the target device and/or other devices in the environment may be specifically queried to provide the context data based at least in part on the directive to perform the action being sent to the target device. In other examples, the context data may be generated and/or sent without a specific query and when the context data is received it may be tagged or otherwise indicated as being context data that is associated with performance of the action by the target device. The context data may be any data that indicates a condition of the environment and/or devices associated with the environment. Examples of context data may include, and are not limited to, device state changes, timing data indicating a time when devices are operated, audio data representing user utterances, intent data indicating determined intents associated with user input, activity state data indicating a state of the environment such as whether user presence is detected, and/or other inputs such as inputs determined as being relevant by one or more machine learning models, as described in more detail herein.

At block 904, the process 900 may include generating a score representing a likelihood that the context data indicates a negative reaction by the user to the action that was performed. For example, to determine how to treat received context data, the model(s) described herein may be configured to generate a score indicating a user reaction to the automatic action as determined from the context data. The score may be any value or otherwise data that quantifies a likelihood that the context data indicates a positive user reaction or a negative user reaction. For example, the score may be from +1 to −1, with +1 indicating a strong likelihood that the context data indicates a positive user reaction to the automatic action or otherwise that the automatic action was intended, and with −1 indicating a strong likelihood that the context data indicates a negative user reaction to the automatic action or otherwise that the automatic action was not intended or preferred. It should be understood that while a given scoring scale has been provided herein, that scale is provided by way of example and not as a limitation.

At block 906, the process 900 may include determining whether the score satisfies a threshold score. For example, the threshold score may be determined for utilizing the context data for near real time learning to determine how to alter how and/or when the automatic action is performed. For example, a threshold score of −0.5 may be established and when a score associated with context data satisfies that threshold, one or more operations may be performed utilizing near real time learning techniques. When the score does not satisfy the threshold score, the context data may be sent to one or more feedback databases. The feedback database(s) may be utilized to aggregate context data and other data that may be utilized for non-near real time learning embodiments.

In examples where the score does not satisfy the threshold score, the process 900 may include, at block 908, storing the store and related context data in an offline feedback database for use in offline feedback modeling. For example, in the absence of near real time learning as described herein the context data may be aggregated with other context data over a period of time and the aggregated data may be analyzed in a non-near real time embodiment to determine whether changes the rules for sending directives or otherwise should be made.

In examples where the score satisfies the threshold score, the process 900 may include, at block 910, utilizing near real time learning to alter if and/or when the directive is sent to perform the action. For example, as described elsewhere herein in more detail, if the determined score is a strong indicator that the context data indicates a negative user reaction to performance of the automatic action, the near real time learning system may be utilized to determine, on the fly, whether to refrain from subsequently sending the directive and/or if the rules and/or conditions for sending the directives should be changed to minimize the possibility of additional negative user reactions when the automatic action is performed.

Figure 10:
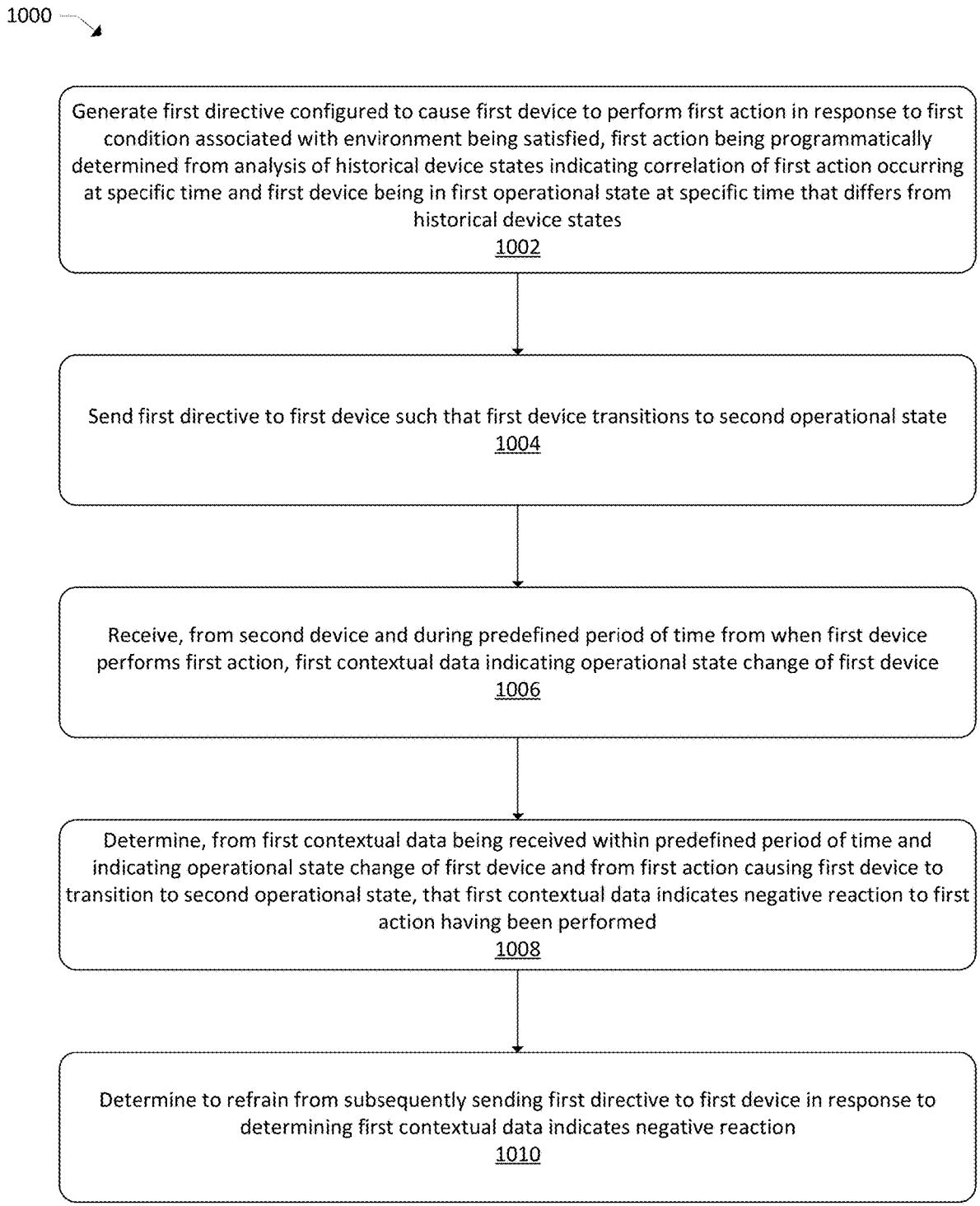
FIG. 10 illustrates a flow diagram of an example process for device control utilizing near real time modeling.

FIG. 10 illustrates a flow diagram of an example process 1000 for device control utilizing near real time learning. The order in which the operations or steps are described is not intended to be construed as a limitation, and any number of the described operations may be combined in any order and/or in parallel to implement process 10000.

At block 1002, the process 1000 may include generating a first directive configured to cause a first device to perform a first action in response to a first condition associated with an environment being satisfied, the first action being programmatically determined from analysis of historical device states indicating a correlation of the first action occurring at a specific time and the first device being in a first operational state at the specific time that differs from the historical device states. For example, a light bulb, plug, thermostat, speaker, etc. may be "smart" or otherwise are configured with computing components that allow for the sending and receipt of signals to operate those devices. With this available technology, suggestions or otherwise "hunches" may be sent to user devices reminding users to operate certain device. Some of these suggestions may cause a device to operate automatically or otherwise without requiring user input prior to operating. Directives to cause such automatically actions to be performed are sent to target devices from a system or are generated by the target devices themselves or by another device located within the environment where the target device is disposed. These directives may be sent when prior user input indicates a preference to do so and/or when it is determined that the actions would be preferred based on historical data, modeling, etc.

However, sometimes the actions performed by target devices may not be preferred by a user. For example, a directive may be sent to a smart light bulb to turn off or otherwise stop emitting light at a given time of the day, say 6:00 pm each evening. But when the light turns off, user feedback may be received that indicates the user did not want the light to be turned off and, in examples, that the user prefers that the light not be subsequently turned off at 6:00 pm each day. Some of this user input may be explicit, such as a user providing a user utterance requesting that the action not be performed again. However, in other examples, implicit user input may be received and utilized to determine whether subsequent directives to turn the light off should be sent and/or whether the conditions to be satisfied prior to sending such directives should be updated or otherwise changed. Additionally, given the implicit nature of these user inputs and/or other context data not necessarily initiated by a user, it may be difficult to determine whether to utilize such data to immediately change how and/or when the directive is sent or whether to utilize such data as one of many signals that are modeled over time to determine how and/or when the directive is sent.

At block 1004, the process 1000 may include sending the first directive to the first device such that the first device transitions to a second operational state. For example, a directive generator may be configured to generate and then send the directive to the device, which may cause the device to perform the action without receiving user input to do so.

At block 1006, the process 1000 may include receiving, from a second device and during a predefined period of time from when the first device performs the first action, first contextual data indicating an operational state change of the first device. For example, once the target device is operated, context data associated with the environment in which the target device is situated may be collected. In examples, the target device and/or other devices in the environment may be specifically queried to provide the context data based at least in part on the directive to perform the action being sent to the target device. In other examples, the context data may be generated and/or sent without a specific query and when the context data is received it may be tagged or otherwise indicated as being context data that is associated with performance of the action by the target device. The context data may be any data that indicates a condition of the environment and/or devices associated with the environment. Examples of context data may include, and are not limited to, device state changes, timing data indicating a time when devices are operated, audio data representing user utterances, intent data indicating determined intents associated with user input, activity state data indicating a state of the environment such as whether user presence is detected, and/or other inputs such as inputs determined as being relevant by one or more machine learning models, as described in more detail herein.

At block 1008, the process 1000 may include, determining, from the first contextual data being received within the predefined period of time and indicating the operational state change of the first device and from the first action causing the first device to transition to the second operational state, that the first contextual data indicates a negative reaction to the first action having been performed. For example, to determine how to treat received context data, the model(s) may be configured to generate a score indicating a user reaction to the automatic action as determined from the context data. The score may be any value or otherwise data that quantifies a likelihood that the context data indicates a positive user reaction or a negative user reaction. For example, the score may be from +1 to −1, with +1 indicating a strong likelihood that the context data indicates a positive user reaction to the automatic action or otherwise that the automatic action was intended, and with −1 indicating a strong likelihood that the context data indicates a negative user reaction to the automatic action or otherwise that the automatic action was not intended or preferred. It should be understood that while a given scoring scale has been provided herein, that scale is provided by way of example and not as a limitation. The model(s) may also be configured to determine whether a given score satisfies a threshold score for utilizing the context data for near real time learning to determine how to alter how and/or when the automatic action is performed. For example, a threshold score of −0.5 may be established and when a score associated with context data satisfies that threshold, one or more operations may be performed utilizing near real time learning techniques. When the score does not satisfy the threshold score, the context data may be sent to one or more feedback databases. The feedback database(s) may be utilized to aggregate context data and other data that may be utilized for non-near real time learning embodiments.

At block 1010, the process 1000 may include determining to refrain from subsequently sending the first directive to the first device in response to determining the first contextual data indicates the negative reaction. For example, when the feedback component determines that the context data indicates a negative user reaction to performance of the automatic action, the feedback component may determine whether to refrain from causing the directive to perform the automatic action to be sent to the target device, at least for a predetermined period of time until analysis of other feedback data can be performed. As such, in some examples, the near real time learning techniques described herein may lead to a result where the system determines to refrain from sending subsequent directives to perform the automatic action to the target device. In other examples, the near real time learning techniques described herein may lead to a result where the system determines new conditions and/or rules to apply for when and/or how the directive is to be sent. For example, using the example provided above, the context data may indicate that when the negative user reaction was received user presence was detected in a room where the target device is situated, and/or device states of other devices in the room differ from typical device states when the automatic action has been previously performed, etc. In these examples, the feedback component may determine one or more conditions associated with the environment in question and may apply those conditions to when the directive is to be sent. In this example, data representing a condition for sending the directive may be generated, with the condition being, for example, that user presence is not detected in the room in question.

Additionally, or alternatively, the process 1000 may include determining a first amount of time from when the first directive is sent and when the first contextual data is received. The process 100 may also include determining the first contextual data indicates a state change of the first device as initiated by user input. In these examples, determining to refrain from subsequently sending the first directive to the device may be in response to the first amount of time and the first contextual data indicating the state change as initiated by the user input.

Additionally, or alternatively, the process 1000 may include receiving, during the predefined period of time from when the device performs the first action, second contextual data. The process 1000 may also include determining that the second contextual data indicates a request to cause the first device to transition to the second operational state. The process 1000 may also include determining, in response to the second contextual data indicating the request to cause the first device to transition to the second operational state, that the second contextual data indicates the first contextual data fails to indicate the negative reaction. The process 1000 may also include determining, in response to the second contextual data indicating the first contextual data fails to indicate the negative reaction, to send the first directive to the first device when the condition is satisfied.

Additionally, or alternatively, the process 1000 may include determining, in response to the first contextual data indicating the negative reaction, a second directive to send to the device, the second directive configured to cause the device to perform a second action that differs from the first action when the condition is satisfied. The process 1000 may also include sending the second directive to the device such that the device is caused to perform the second action when the condition is satisfied.

Additionally, or alternatively, the process 1000 may include determining a second condition detected in association with the environment when the first contextual data was received. The process 1000 may also include determining that the second condition differs from historical conditions of the environment when the first action has previously been performed by the first device. The process 1000 may also include associating the second condition with the first action such that the first directive is sent when the second condition is absent from the environment. The process 1000 may also include sending the first directive in response to the first condition being satisfied and the second condition being absent from the environment.

Figure 11:
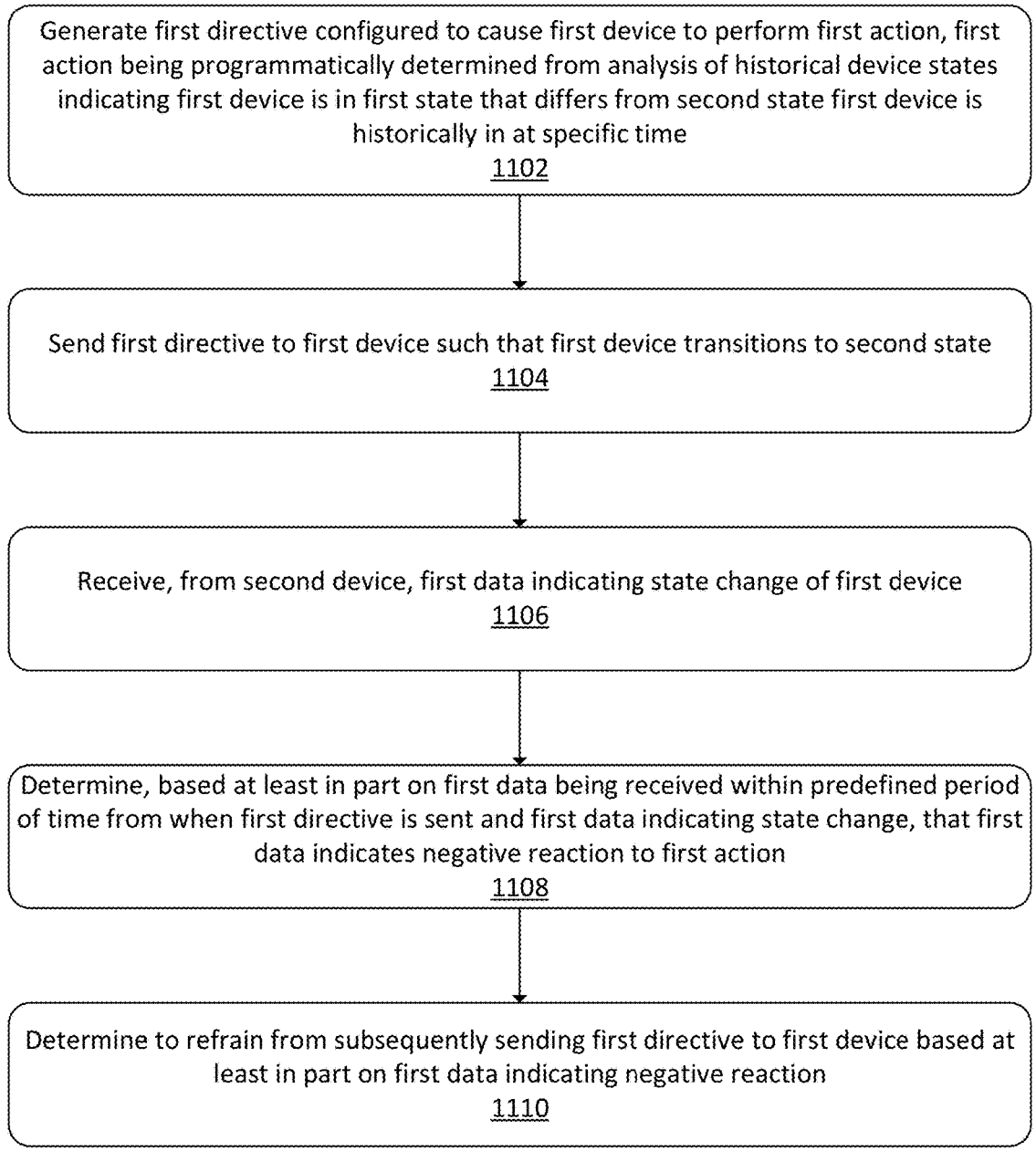
FIG. 11 illustrates a flow diagram of another example process for device control utilizing near real time modeling.

FIG. 11 illustrates a flow diagram of another example process 1100 for device control utilizing near real time learning. The order in which the operations or steps are described is not intended to be construed as a limitation, and any number of the described operations may be combined in any order and/or in parallel to implement process 1100.

At block 1102, the process 1100 may include generating a first directive configured to cause a first device to perform a first action, the first action being programmatically determined from analysis of historical device states indicating the first device is in a first state that differs from a second state the first device is historically in at a specific time. For example, a light bulb, plug, thermostat, speaker, etc. may be "smart" or otherwise are configured with computing components that allow for the sending and receipt of signals to operate those devices. With this available technology, suggestions or otherwise "hunches" may be sent to user devices reminding users to operate certain device. Some of these suggestions may cause a device to operate automatically or otherwise without requiring user input prior to operating. Directives to cause such automatically actions to be performed are sent to target devices from a system or are generated by the target devices themselves or by another device located within the environment where the target device is disposed. These directives may be sent when prior user input indicates a preference to do so and/or when it is determined that the actions would be preferred based on historical data, modeling, etc.

However, sometimes the actions performed by target devices may not be preferred by a user. For example, a directive may be sent to a smart light bulb to turn off or otherwise stop emitting light at a given time of the day, say 6:00 pm each evening. But when the light turns off, user feedback may be received that indicates the user did not want the light to be turned off and, in examples, that the user prefers that the light not be subsequently turned off at 6:00 pm each day. Some of this user input may be explicit, such as a user providing a user utterance requesting that the action not be performed again. However, in other examples, implicit user input may be received and utilized to determine whether subsequent directives to turn the light off should be sent and/or whether the conditions to be satisfied prior to sending such directives should be updated or otherwise changed. Additionally, given the implicit nature of these user inputs and/or other context data not necessarily initiated by a user, it may be difficult to determine whether to utilize such data to immediately change how and/or when the directive is sent or whether to utilize such data as one of many signals that are modeled over time to determine how and/or when the directive is sent.

At block 1104, the process 1100 may include sending the first directive to the first device such that the first device transitions to the second state. For example, a directive generator may be configured to generate and then send the directive to the device, which may cause the device to perform the action without receiving user input to do so.

At block 1106, the process 1100 may include receiving, from a second device, first data indicating a state change of the first device. For example, once the target device is operated, context data associated with the environment in which the target device is situated may be collected. In examples, the target device and/or other devices in the environment may be specifically queried to provide the context data based at least in part on the directive to perform the action being sent to the target device. In other examples, the context data may be generated and/or sent without a specific query and when the context data is received it may be tagged or otherwise indicated as being context data that is associated with performance of the action by the target device. The context data may be any data that indicates a condition of the environment and/or devices associated with the environment. Examples of context data may include, and are not limited to, device state changes, timing data indicating a time when devices are operated, audio data representing user utterances, intent data indicating determined intents associated with user input, activity state data indicating a state of the environment such as whether user presence is detected, and/or other inputs such as inputs determined as being relevant by one or more machine learning models, as described in more detail herein.

At block 1108, the process 1100 may include determining, based at least in part on the first data being received within a predefined period of time from when the first directive is sent and the first data indicating the state change, that the first data indicates a negative reaction to the first action. For example, to determine how to treat received context data, the model(s) may be configured to generate a score indicating a user reaction to the automatic action as determined from the context data. The score may be any value or otherwise data that quantifies a likelihood that the context data indicates a positive user reaction or a negative user reaction. For example, the score may be from +1 to −1, with +1 indicating a strong likelihood that the context data indicates a positive user reaction to the automatic action or otherwise that the automatic action was intended, and with −1 indicating a strong likelihood that the context data indicates a negative user reaction to the automatic action or otherwise that the automatic action was not intended or preferred. It should be understood that while a given scoring scale has been provided herein, that scale is provided by way of example and not as a limitation. The model(s) may also be configured to determine whether a given score satisfies a threshold score for utilizing the context data for near real time learning to determine how to alter how and/or when the automatic action is performed. For example, a threshold score of −0.5 may be established and when a score associated with context data satisfies that threshold, one or more operations may be performed utilizing near real time learning techniques. When the score does not satisfy the threshold score, the context data may be sent to one or more feedback databases. The feedback database(s) may be utilized to aggregate context data and other data that may be utilized for non-near real time learning embodiments.

At block 1110, the process 1100 may include determining to refrain from subsequently sending the first directive to the first device based at least in part on the first data indicating the negative reaction. For example, when the feedback component determines that the context data indicates a negative user reaction to performance of the automatic action, the feedback component may determine whether to refrain from causing the directive to perform the automatic action to be sent to the target device, at least for a predetermined period of time until analysis of other feedback data can be performed. As such, in some examples, the near real time learning techniques described herein may lead to a result where the system determines to refrain from sending subsequent directives to perform the automatic action to the target device. In other examples, the near real time learning techniques described herein may lead to a result where the system determines new conditions and/or rules to apply for when and/or how the directive is to be sent. For example, using the example provided above, the context data may indicate that when the negative user reaction was received user presence was detected in a room where the target device is situated, and/or device states of other devices in the room differ from typical device states when the automatic action has been previously performed, etc. In these examples, the feedback component may determine one or more conditions associated with the environment in question and may apply those conditions to when the directive is to be sent. In this example, data representing a condition for sending the directive may be generated, with the condition being, for example, that user presence is not detected in the room in question.

Additionally, or alternatively, the process 1100 may include determining a first amount of time from when the first directive is sent and when the first data is received. The process 1100 may also include determining the first data indicates a state change of the device initiated by user input. In these examples, determining to refrain from subsequently sending the first directive may be based at least in part on the first amount of time and the first data indicating the state change.

Additionally, or alternatively, the process 1100 may include receiving, during the predefined period of time, second data. The process 1100 may also include determining that the second data indicates the first data is unassociated with the user reaction. The process 1100 may also include determining, based at least in part on the second data indicating the first data is unassociated with the user reaction, to send the first directive to the device when the condition is satisfied.

Additionally, or alternatively, the process 1100 may include determining, based at least in part on the first data indicating the negative reaction, a second directive to send to the device, the second directive configured to cause the device to perform a second action that differs from the first action. The process 1100 may also include sending the second directive to the device such that the device is caused to perform the second action when the condition is satisfied.

Additionally, or alternatively, the process 1100 may include determining a second condition detected in association with the environment when the first data was received and determining that the second condition differs from historical conditions of the environment when the first action has previously been performed by the first device. The process 1100 may also include associating the second condition with the first action such that the first directive is sent when the second condition is absent from the environment. The process 1100 may also include sending the first directive in response to the first condition being satisfied and the second condition being absent from the environment.

Additionally, or alternatively, the process 1100 may include determining that a second directive to cause the device to perform a second action is scheduled to be performed. The process 1100 may also include determining that the second directive is associated with the first directive. The process 1100 may also include determining, based at least in part on refraining from sending the first directive, to refrain from sending the second directive to the device.

Additionally, or alternatively, the process 1100 may include receiving audio data representing a user utterance and determining, from the audio data, that the user utterance indicates a request to transition the device from the second state to the first state. The process 1100 may also include determining that the audio data was received within a threshold period of time from when the first action is performed by the device. In these examples, determining to refrain from subsequently sending the first directive may be based at least in part on the user utterance indicating the request to transition the device from the second state to the first state and the audio data being received within the threshold period of time.

Additionally, or alternatively, the process 1100 may include determining a set of conditions associated with the device when the first data is received. The process 1100 may also include associating the set of conditions with the first directive such that the first directive is sent when the set of conditions are determined to be absent.

Additionally, or alternatively, the process 1100 may include determining a value representing a likelihood that the first data indicates the negative reaction. The process 1100 may also include determining, from feedback data received in association with account data of the device, a threshold value for indicating that the negative reaction has occurred and determining that the value satisfies the threshold value. In these examples, determining that the first data indicates the negative reaction may be based at least in part on the value satisfying the threshold value.

Figure 12:
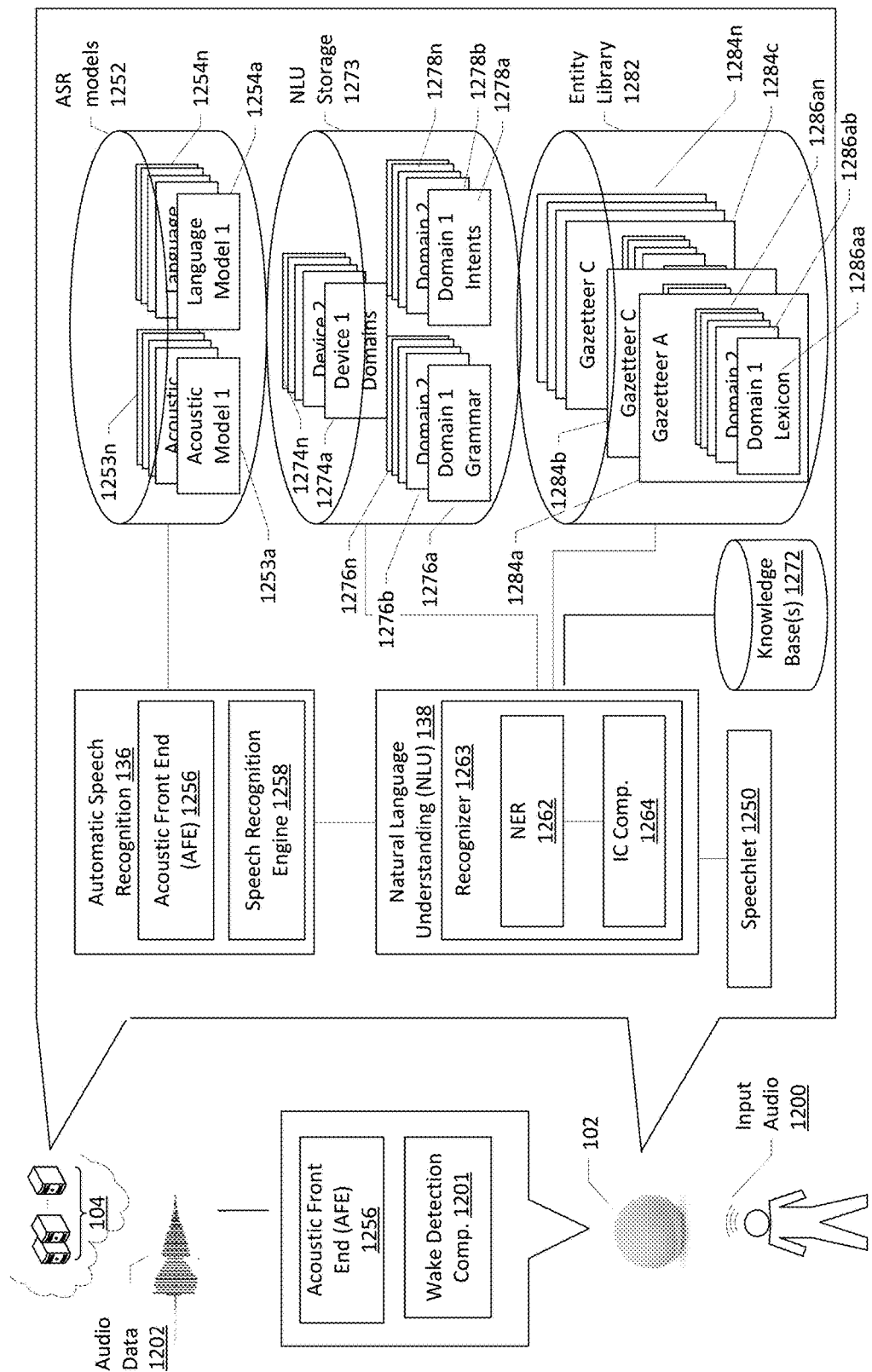
FIG. 12 illustrates a conceptual diagram of components of a speech-processing system for processing audio data provided by one or more devices.

FIG. 12 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 12 may occur directly or across a network 106. An audio capture component, such as a microphone 114 of the device 102, or another device, captures audio 1200 corresponding to a spoken utterance. The device 102, using a wake word engine 1201, then processes audio data corresponding to the audio 1200 to determine if a keyword (such as a wakeword) is detected in the audio data. Following detection of a wakeword, the device 102 processes audio data 1202 corresponding to the utterance utilizing an ASR component 136. The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR component 138.

The wake word engine 1201 works in conjunction with other components of the user device, for example a microphone to detect keywords in audio 1200. For example, the device may convert audio 1200 into audio data, and process the audio data with the wake word engine 1201 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1202 may include data corresponding to the wakeword. Further, a local device may "wake" upon detection of speech/spoken audio above a threshold, as described herein. An ASR component 136 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256).

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn the light back off?" The wake detection component may identify the wake word, otherwise described as a trigger expression, "Alexa," in the user utterance and may "wake" based on identifying the wake word. The speech recognition engine 1258 may identify, determine, and/or generate text data corresponding to the user utterance, here "turn the light back off."

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 138 may include various components, including potentially dedicated processor(s), memory, storage, etc. As shown in FIG. 12, an NLU component 138 may include a recognizer 1263 that includes a named entity recognition (NER) component 1262 which is used to identify portions of query text that correspond to a named entity that may be recognizable by the system. A downstream process called named entity resolution links a text portion to a specific entity known to the system. To perform named entity resolution, the system may utilize gazetteer information (1284a-1284n) stored in entity library storage 1282. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 136 based on the utterance input audio 1200) and attempts to make a semantic interpretation of the text. That is, the NLU process determines the meaning behind the text based on the individual words and then implements that meaning. NLU processing 138 interprets a text string to derive an intent or a preferred action from the user as well as the pertinent pieces of information in the text that allow a device (e.g., device 102) to complete that action. For example, if a spoken utterance is processed using ASR 136 and outputs the text "turn the light back off" the NLU process may determine that the user intended to operate a smart home device, with the device being a light that was recently turned on automatically, for example. The NLU 138 may process several textual inputs related to the same utterance. For example, if the ASR 136 outputs N text segments (as part of an N-best list), the NLU may process all N outputs to obtain NLU results.

As will be discussed further below, the NLU process may be configured to parse and tag to annotate text as part of NLU processing. For example, for the text "turn the light back off," "turn off" may be tagged as a directive (to operate the device) and "the light" may be tagged as the naming identifier of the device to operate.

To correctly perform NLU processing of speech input, an NLU process 138 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1262 receives a query in the form of ASR results and attempts to identify relevant grammars and lexical information that may be used to construe meaning. To do so, the NLU component 138 may begin by identifying potential domains that may relate to the received query. The NLU storage 1273 includes a database of devices (1274a-1274n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1264 parses the query to determine an intent or intents for each identified domain, where the intent corresponds to the action to be performed that is responsive to the query. Each domain is associated with a database (1278a-1278n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1264 identifies potential intents for each identified domain by comparing words in the query to the words and phrases in the intents database 1278. In some instances, the determination of an intent by the IC component 1264 is performed using a set of rules or templates that are processed against the incoming text to identify a matching intent.

In order to generate a particular interpreted response, the NER 1262 applies the grammar models and lexical information associated with the respective domain to actually recognize a mention of one or more entities in the text of the query. In this manner, the NER 1262 identifies "slots" or values (i.e., particular words in query text) that may be needed for later command processing. Depending on the complexity of the NER 1262, it may also label each slot with a type of varying levels of specificity (such as noun, place, device name, device location, city, artist name, song name, amount of time, timer number, or the like). Each grammar model 1276 includes the names of entities (i.e., nouns) commonly found in speech about the particular domain (i.e., generic terms), whereas the lexical information 1286 from the gazetteer 1284 is personalized to the user(s) and/or the device. For instance, a grammar model associated with the shopping domain may include a database of words commonly used when people discuss shopping.

The intents identified by the IC component 1264 are linked to domain-specific grammar frameworks (included in 1276) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1276) framework or frameworks may correspond to sentence structures such as "purchase item called 'Item A' from Marketplace A."

For example, the NER component 1262 may parse the query to identify words as subject, object, verb, preposition, etc., based on grammar rules and/or models, prior to recognizing named entities. The identified verb may be used by the IC component 1264 to identify intent, which is then used by the NER component 1262 to identify frameworks. A framework for the intent of "play a song," meanwhile, may specify a list of slots/fields applicable to play the identified "song" and any object modifier (e.g., specifying a music collection from which the song should be accessed) or the like. The NER component 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1262 may search the database of generic words associated with the domain (in the knowledge base 1272). So, for instance, if the query was "identify this song," after failing to determine which song is currently being output, the NER component 1262 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 1250. The destination speechlet 1250 may be determined based on the NLU output. For example, if the NLU output includes a command to send a message, the destination speechlet 1250 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 1250 may provide some or all of this information to a text-to-speech (TTS) engine. The TTS engine may then generate an actual audio file for outputting the audio data determined by the application (e.g., "okay," or "items ordered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 136). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC component 1264 and other components such as an entity resolver, or other components.

For example, a messaging domain recognizer 1263-A (Domain A) may have an NER component 1262-A that identifies what slots (i.e., portions of input text) may correspond to particular words relevant to that domain. The words may correspond to entities such as (for the messaging domain) a recipient. An NER component 1262 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user prefers the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 13:
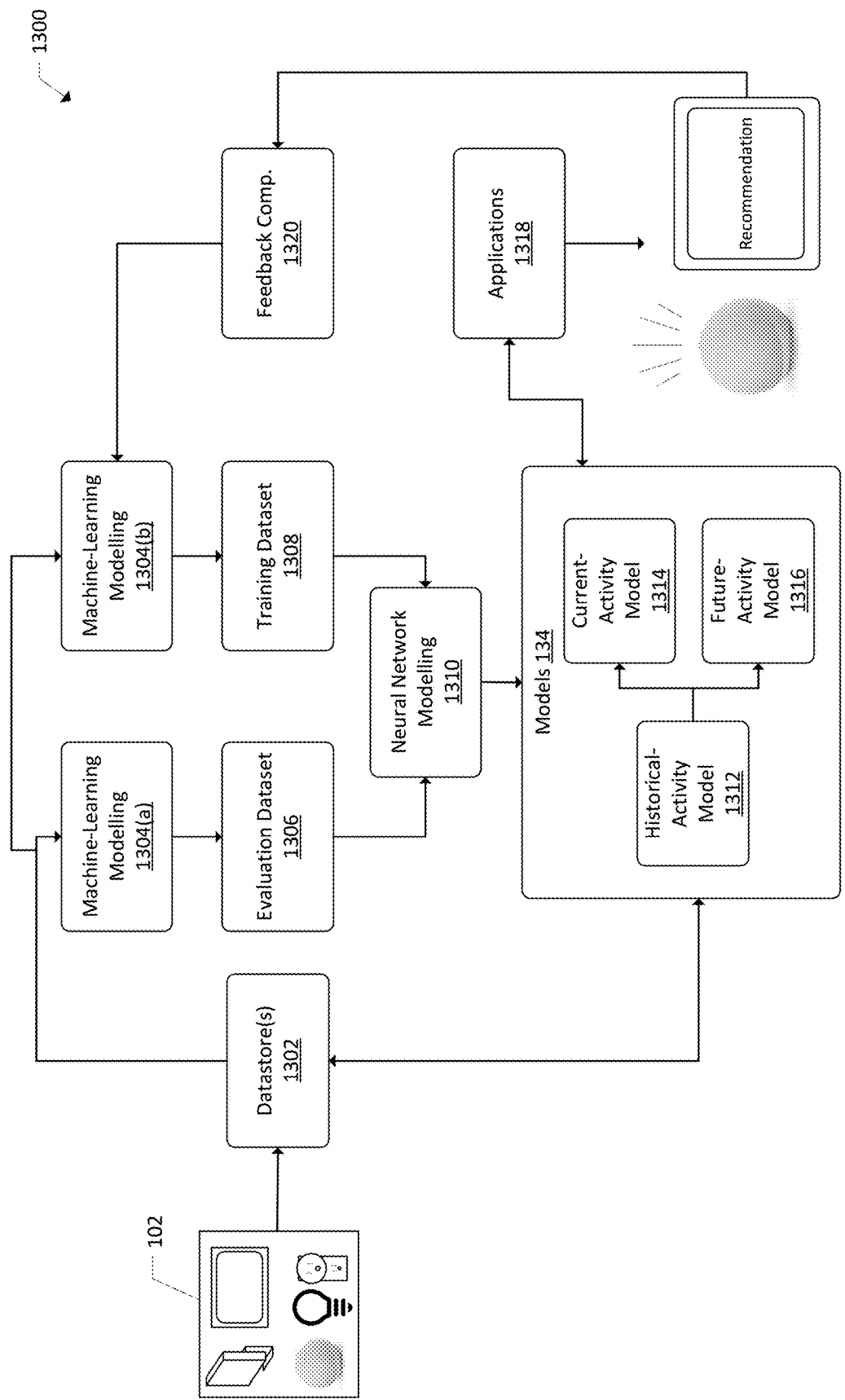
FIG. 13 illustrates a conceptual diagram of components of a system for utilizing activity models to determine an activity state associated with a given environment.

FIG. 13 illustrates a conceptual diagram of components of a system 1300 for training models for activity modeling. The components of the system 1300 are described by way of example below.

For example, the one or more devices 102 may receive and/or send data indicating the state of the one or more devices, data indicating that a mobile device is in proximity to a given device such that the devices are in wireless communication with each other over a short-range communication network, data indicating the detection of movement in the environment, data indicating that an acoustic-event detection component of a device has identified an acoustic event, and/or other data such as naming indicators of the devices may be received and/or determined. This data may be generated and stored for devices associated with a given environment and/or for multiple electronic devices associated with multiple disparate environments. The devices and/or a system may generate and store this data, which may be utilized to generate and/or train models for determining the activity state associated with a given user profile. It should be understood that while examples of such event data are provided herein, those examples are not by way of limitation. Instead, the event data received from the devices may include any data that may indicate a state of the devices, other devices, and/or the environment.

The event data may be sent to the system, which may store the event data in one or more databases, such as the datastores 1302. The event data may be made available to one or more components of the system for activity modeling as described herein. For example, the machine-learning modelling 1304(*a*)-(*b*) may be utilized to accept the event data, and/or a formatted version of the event data from the datastores 1302 and perform an analysis of the event data that includes labelling the event data with one or more indicators of an activity state. For example, machine-learning models may be configured to apply one or more rules to given events to label those events with an activity state. For example, event data indicating that a light has been turned on may be labeled by the machine-learning models as being associated with an active state, as opposed to an asleep state or an away state. A first machine-learning model may generate the training dataset 1308 that includes the event data and the labeling data associated with the event data. The training dataset 1308 may be stored in association with a training database. Additionally, in examples, one or more of the devices and/or user profiles associated with the devices may be predetermined to be included in the evaluation dataset 1306, which may also be stored in association with the training database. For example, certain devices may have sensors that are better suited for determining activity states and/or use of devices by given user profiles may be considered more beneficial for accurately determining activity states. In these examples, a portion of the event data corresponding to the predetermined devices and/or user profiles may be input into the separate machine-learning model to generate the evaluation dataset 1306. The evaluation dataset 1306 may represent a smaller subset of the event data utilized to generate the training dataset 1308. The evaluation dataset 1306 may be utilized by other models, as described more fully below, to test or otherwise determine the accuracy of the labeling associated with the training dataset 1308.

The neural network modelling 1310 may include accepting the evaluation dataset 1306 and/or the training dataset 1308 from the machine-learning models to generate and/or train one or more activity models 134. For example, the neural network modelling may represent a more robust machine-learning model than the machine-learning models utilized for machine-learning modelling 1304(*a*)-(*b*) described herein. The neural network model may utilize the event data and the labeling data to identify events indicative of electronic devices and/or environments being in an active state, being in an asleep state, and/or being in an away state. The neural network model may also determine, over time, one or more trends in the event data indicating that certain events are more likely or less likely, depending on the circumstance, to indicate a given activity state. The trends may also include identifying events that were previously unlabeled by the machine-learning models that impact identification of activity state. By so doing, the neural network model may "learn" how certain events, such as for certain electronic devices and/or environments, impact determining activity states.

The activity models 134 generated and/or trained utilizing the neural network model may include one or more activity models 134 that are configured to accept event data and generate, as output, results indicating that given event data corresponds to a given activity state and, in examples, a confidence associated with the activity state determination. The activity models 139 may include the historical-activity model 1312, which may be configured to determine an activity state associated with historical events associated with an electronic device and/or environment. For example, the historical-activity model 1312 may be configured to accept, as features to the historical-activity model 1312, event data corresponding to historical events. The historical-activity model 1312 may generate, as output, data indicating that a given historical event corresponded to a given activity state. For example, the historical-activity model 1312 may be utilized to determine that a given time a week ago a given environment was associated with an asleep state based at least in part on the event data associated with that given time.

The activity models 134 may also include the current-activity model 1314, which may be configured to determine an activity state associated with a live or near-live event associated with an electronic device and/or environment. For example, the current-activity model 1314 may be configured to accept, as features to the current-activity model 1314, event data corresponding to live events and/or near-live events. In examples, use of the current-activity model 1314 may be in association with the electronic device and/or the system causing one or more sensors or other components of the electronic device to generate live or near-live event data to be utilized by the current-activity model 1314. The current-activity model 1314 may generate, as output, data indicating that a given live or near-live event corresponds to a given activity state. For example, the current-activity model 1314 may be utilized to determine that at a current time a given environment is associated with an active state based at least in part on event data associated with the current time. In examples, the current-activity model 1314 may be trained based at least in part on the output from the neural network model and/or from the output of the historical-activity model 1312.

The activity models 134 may also include the future-activity model 1316, which may be configured to predict an activity state associated with events that may occur in the future associated with an electronic device and/or environment. For example, the future-activity model 1316 may be configured to accept, as features to the future-activity model 1316, event data corresponding to the historical events and/or live or near-live events. The future-activity model 1316 may generate, as output, data indicating that a given event that is likely to occur at a given time in the future is likely to correspond to a given activity state. For example, the future-activity model 1316 may be utilized to determine that at a given time a week from now a given environment is likely to be associated with an away state based at least in part on historical event data and/or current event data associated with the given environment. In examples, the future-activity model 1316 may be trained based at least in part on the output from the neural network model and/or from the output of the historical-activity model 1312 and/or the current-activity model 1314.

The activity models 134 may be made available to the one or more applications 1318 associated with the system and/or one or more other systems. For example, the one or more applications 1318 may be able to utilize activity state determinations to generate more accurate results and/or to determine when to perform certain operations, such as when to generate and/or send a notification and/or recommendation, when to operate a device, when to transition a state of a device, etc. In these examples, one or more of the applications 1318 may send request data to the activity models 134 for an indication of an activity of a device and/or environment in the past, now, or in the future. In some examples, the request data may indicate which of the activity models 134 are to be utilized for determining the activity state. In other examples, the request data may provide an indication of which events the application 1318 would like to determine the activity state for, and the remote system may determine which of the activity models 134 to utilize to provide results relevant to those events. The selected activity model 134 may then query the datastores 1302 for the event data relevant to the request from the application 1318 and utilize, as input to the selected activity model 134, features corresponding to the event data. The selected activity model 134 may output data indicating the determined activity state for the device and/or environment at issue and, in examples, a confidence value associated with the determined activity state. The application 1318 that sent the request data may then utilize the activity state as determined by the selected activity model 134 to perform one or more actions, such as the sending of a recommendation and/or the operation of a device, for example.

Additionally, in examples, users may provide user input indicating that the device is accurately or inaccurately in the indicated state. User input data corresponding to this user input may be sent from the device to the feedback component 1320. The feedback component 1320 may be configured to receive the user input data and utilize the user input data to train one or more of the machine-learning models and/or the neural network model. By so doing, the feedback component 1320 may generate a positive dataset, in situations where the user input indicates accurate activity state determinations, indicating an approximated ground truth that the events associated with a given activity state determination were in fact associated with the determined activity state. The feedback component 1320 may also generate a negative dataset, in situations where the user input indicates inaccurate activity state determinations, indicating that the events associated with that activity state determination were not associated with the determined activity state.

The activity models 134 may also be configured to select which data from the various devices is to be used and what data is specifically not to be used. For example, device state data from certain devices, such as security-related devices, may indicate activity states, but may not be used in the event that such data would result in an inaccurate prediction of activity state. For example, a door lock device may indicate that a door is currently unlocked. Such a signal may indicate that a user is present in the environment, even when other data indicates the user has moved away from the environment. Similarly, a garage door opening device may indicate that a garage door is open and thus that a user is potentially present even if the user has left the environment but forgot to close the garage door. Likewise, a security system may be in a disarmed state indicating the user is present, but again the user may have just forgot to arm the security system. In these and other examples, the device type of the devices at issue may be utilized to determine which device data to utilize for activity state prediction. In examples, data from device types associated with security-related functionality, such as door locks, security systems, garage doors, window sensors, door sensors, motion sensors, etc. may not be utilized or may be given limited weight when determine activity states of the system at issue.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
generating a first directive configured to cause a first device to perform a first action in response to a first condition associated with an environment being satisfied, the first action being programmatically determined from analysis of historical device states indicating a correlation of the first action occurring at a time of day and the first device being in a first operational state at the time of day that differs from the historical device states;
sending the first directive to the first device such that the first device transitions to a second operational state;
receiving, from a second device and during a predefined period of time from when the first device performs the first action, first contextual data indicating an operational state change of the first device;
determining, from the first contextual data being received within the predefined period of time and indicating the operational state change of the first device and from the first action causing the first device to transition to the second operational state, that the first contextual data indicates a negative reaction to the first action having been performed; and
determining to refrain from subsequently sending the first directive to the first device in response to determining the first contextual data indicates the negative reaction.

2. The system of claim 1, the operations further comprising:
determining a first amount of time from when the first directive is sent and when the first contextual data is received;
determining the first contextual data indicates the operational state change of the first device as initiated by user input; and
wherein determining to refrain from subsequently sending the first directive to the first device is in response to the first amount of time and the first contextual data indicating the operational state change as initiated by the user input.

3. The system of claim 1, the operations further comprising:
receiving, during the predefined period of time from when the first device performs the first action, second contextual data;
determining that the second contextual data indicates a request to cause the first device to transition to the second operational state;
determining, in response to the second contextual data indicating the request to cause the first device to transition to the second operational state, that the second contextual data indicates the first contextual data fails to indicate the negative reaction; and
determining, in response to the second contextual data indicating the first contextual data fails to indicate the negative reaction, to send the first directive to the first device when the condition is satisfied.

4. The system of claim 1, the operations further comprising:
determining a second condition detected in association with the environment when the first contextual data was received;
determining that the second condition differs from historical conditions of the environment when the first action has previously been performed by the first device;
associating the second condition with the first action such that the first directive is sent when the second condition is absent from the environment; and
sending the first directive in response to the first condition being satisfied and the second condition being absent from the environment.

5. A method, comprising:
generating a first directive configured to cause a first device to perform a first action, the first action being programmatically determined from analysis of historical device states indicating the first device is in a first state that differs from a second state the first device is historically in at a time of day;
sending the first directive to the first device such that the first device transitions to the second state;
receiving, from a second device, first data indicating a state change of the first device;
determining, based at least in part on the first data being received within a predefined period of time from when the first directive is sent and the first data indicating the state change, that the first data indicates a negative reaction to the first action; and
determining to refrain from subsequently sending the first directive to the first device based at least in part on the first data indicating the negative reaction.

6. The method of claim 5, further comprising:
determining a first amount of time from when the first directive is sent and when the first data is received;
determining the first data indicates a state change of the first device as initiated by user input; and wherein determining to refrain from subsequently sending the first directive comprises determining to refrain from subsequently sending the first directive based at least in part on the first amount of time and the first data being initiated by the user input.

7. The method of claim 5, further comprising:
receiving, during the predefined period of time, second data;
determining that the second data indicates the first data is unassociated with the first action being performed; and
determining, based at least in part on the second data indicating the first data is unassociated with the first action being performed, to send the first directive to the first device.

8. The method of claim 5, further comprising:
determining a second condition detected in association with an environment when the first data was received;
determining that the second condition differs from historical conditions of the environment when the first action has previously been performed by the first device;
associating the second condition with the first action such that the first directive is sent when the second condition is absent from the environment; and
sending the first directive in response to the first condition being satisfied and the second condition being absent from the environment.

9. The method of claim 5, further comprising:
determining that a second directive to cause the first device to perform a second action is scheduled to be performed;
determining that the second directive is associated with the first directive; and
determining, based at least in part on refraining from sending the first directive, to refrain from sending the second directive to the first device.

10. The method of claim 5, further comprising:
receiving audio data representing a user utterance;
determining, from the audio data, that the user utterance indicates a request to transition the device from the second state to the first state;
determining that the audio data was received within a threshold period of time from when the first action is performed by the device; and
wherein determining to refrain from subsequently sending the first directive comprises determining to refrain from subsequently sending the first directive based at least in part on the user utterance indicating the request to transition the first device from the second state to the first state and the audio data being received within the threshold period of time.

11. The method of claim 5, further comprising:
determining a set of conditions associated with the first device when the first data is received; and
associating the set of conditions with the first directive such that the first directive is sent when the set of conditions are determined to be absent.

12. The method of claim 5, further comprising:
determining a value representing a likelihood that the first data indicates the negative reaction;
determining, from feedback data received in association with account data of the device, a threshold value for indicating that the negative reaction has occurred;
determining that the value satisfies the threshold value; and
wherein determining that the first data indicates the negative reaction comprises determining that the first data indicates the negative reaction based at least in part on the value satisfying the threshold value.

13. A system, comprising:
one or more processors; and
non-transitory computer-readable media storing computer-executable instructions that, when executed by the one or more processors, cause the one or more processors to perform operations comprising:
generating a first directive configured to cause a first device to perform a first action, the first action being programmatically determined from analysis of historical device states indicating the first device is in a first state that differs from a second state the first device is historically in at a time of day;
sending the first directive to the first device such that the first device transitions to the second state;
receiving, from a second device, first data indicating a state change of the first device;
determining, based at least in part on the first data being received within a predefined period of time from when the first directive is sent and the first data indicating the state change, that the first data indicates a negative reaction to the first action; and
determining to refrain from subsequently sending the first directive to the first device based at least in part on the first data indicating the negative reaction.

14. The system of claim 13, the operations further comprising:
determining a first amount of time from when the first directive is sent and when the first data is received;
determining the first data indicates a state change of the first device as initiated by user input; and
wherein determining to refrain from subsequently sending the first directive comprises determining to refrain from subsequently sending the first directive based at least in part on the first amount of time and the first data being initiated by the user input.

15. The system of claim 13, the operations further comprising:
receiving, during the predefined period of time, second data;
determining that the second data indicates the first data is unassociated with the first action being performed; and
determining, based at least in part on the second data indicating the first data is unassociated with the first action being performed, to send the first directive to the first device.

16. The system of claim 13, the operations further comprising:
determining, based at least in part on the first data indicating the negative reaction, a second directive to send to the first device, the second directive configured to cause the first device to perform a second action that differs from the first action; and
sending the second directive to the first device such that the first device is caused to perform the second action.

17. The system of claim 13, the operations further comprising:
determining that a second directive to cause the first device to perform a second action is scheduled to be performed;
determining that the second directive is associated with the first directive; and
determining, based at least in part on refraining from sending the first directive, to refrain from sending the second directive to the first device.

18. The system of claim 13, the operations further comprising:
- receiving audio data representing a user utterance;
- determining, from the audio data, that the user utterance indicates a request to transition the first device from the second state to the first state;
- determining that the audio data was received within a threshold period of time from when the first action is performed by the first device; and
- wherein determining to refrain from subsequently sending the first directive comprises determining to refrain from subsequently sending the first directive based at least in part on the user utterance indicating the request to transition the first device from the second state to the first state and the audio data being received within the threshold period of time.

19. The system of claim 13, the operations further comprising:
- determining a set of conditions associated with the first device when the first data is received; and
- associating the set of conditions with the first directive such that the first directive is sent when the set of conditions are absent.

20. The system of claim 13, the operations further comprising:
- determining a value representing a likelihood that the first data indicates the negative reaction;
- determining, from feedback data received in association with account data, a threshold value for indicating that the negative reaction has occurred;
- determining that the value satisfies the threshold value; and
- wherein determining that the first data indicates the negative reaction comprises determining that the first data indicates the negative reaction based at least in part on the value satisfying the threshold value.

* * * * *